US005712989A

United States Patent [19]
Johnson et al.

[11] Patent Number: 5,712,989
[45] Date of Patent: Jan. 27, 1998

[54] JUST-IN-TIME REQUISITION AND INVENTORY MANAGEMENT SYSTEM

[75] Inventors: James M. Johnson, Bridgeville; Douglas A. Momyer, Upper St. Clair, both of Pa.

[73] Assignee: Fisher Scientific Company, Pittsburgh, Pa.

[21] Appl. No.: 42,168

[22] Filed: Apr. 2, 1993

[51] Int. Cl.⁶ .................................................. G06F 17/30
[52] U.S. Cl. ...................... 395/228; 395/222; 395/229; 395/200.03; 395/601; 364/468.05; 364/468.14; 235/385
[58] Field of Search ..................... 395/600, 165, 395/155, 161, 228, 729; 364/468, 413.01, 401, 403, 478, 188–189, 468.05, 468.14; 235/375, 385, 383

[56] References Cited

U.S. PATENT DOCUMENTS

| | | | |
|---|---|---|---|
| 4,336,589 | 6/1982 | Smith et al. | 364/468.14 |
| 4,509,123 | 4/1985 | Vereen | 364/468.14 |
| 4,636,950 | 1/1987 | Caswell et al. | 364/468.16 |
| 4,656,591 | 4/1987 | Goldberg | 364/478 |
| 4,807,177 | 2/1989 | Ward | 364/DIG. 2 |
| 4,843,546 | 6/1989 | Yosida et al. | 364/468.14 |
| 4,887,208 | 12/1989 | Schneider et al. | 364/403 |
| 4,916,611 | 4/1990 | Doyle, Jr. et al. | 364/468.05 |
| 4,920,488 | 4/1990 | Filley | 364/468.14 |
| 4,949,248 | 8/1990 | Caro | 364/DIG. 1 |
| 4,958,280 | 9/1990 | Pauly et al. | 364/468.14 |
| 4,958,292 | 9/1990 | Kaneko et al. | 364/468.01 |
| 4,972,318 | 11/1990 | Brown et al. | 364/468.14 |
| 4,972,504 | 11/1990 | Daniel, Jr. et al. | 364/468.14 |
| 4,984,155 | 1/1981 | Geier et al. | 364/401 |
| 5,006,983 | 4/1991 | Wayne et al. | 364/468.14 |
| 5,038,283 | 8/1991 | Caveney | 364/468.05 |
| 5,077,665 | 12/1991 | Silverman et al. | 364/468.14 |
| 5,101,352 | 3/1992 | Rembert | 364/468.14 |
| 5,103,079 | 4/1992 | Barakai et al. | 235/380 |
| 5,117,354 | 5/1992 | Long et al. | 364/468.05 |
| 5,117,355 | 5/1992 | McCarthy | 364/468.05 |
| 5,163,000 | 11/1992 | Rogers et al. | 364/424.01 |
| 5,168,444 | 12/1992 | Cukor et al. | 364/401 |
| 5,168,445 | 12/1992 | Kawashima et al. | 364/403 |
| 5,172,313 | 12/1992 | Schumacher | 364/401 |
| 5,177,680 | 1/1993 | Tsukino et al. | 364/401 |
| 5,193,065 | 3/1993 | Guerindon et al. | 364/468 |
| 5,204,821 | 4/1993 | Inui et al. | 364/468 |
| 5,334,822 | 8/1994 | Sanford | 235/385 |

OTHER PUBLICATIONS

*SNA Transation Programmer's Reference Manual For LU Type 6.2*, pp. 1–1 to 1–6 (1991).

(List continued on next page.)

Primary Examiner—Thomas G. Black
Assistant Examiner—Hosain T. Alam
Attorney, Agent, or Firm—Gene A. Tabachnick; Reed Smith Shaw & McClay

[57] ABSTRACT

In accordance with the present invention, a requisition and inventory management system is provided which employs both a host computer and a local computer which can be linked to permit two-way data communications in a real time environment. Each computer has an associated database which can be accessed by that computer. By accessing its respective database, each computer can build and transmit to the other computer communications blocks of data relating to a particular requisition of an item in Just-in-Time (JIT) inventory or to the management of the JIT inventory. The other computer can then use the received data to continue processing of the requisition or to update its JIT inventory records. Thus requisition records are created from a real-time interaction between the host and local computers, with each computer using data from its respective database in conjunction with information entered by a Customer Service Representative (CSR) operating the local computer.

The system of the present invention also utilizes means for automatically determining which items in the JIT inventory are likely to require replenishment. The system then proposes a purchase or transfer order for an optimum quantity of the item, which the CSR may accept or modify.

38 Claims, 12 Drawing Sheets

OTHER PUBLICATIONS

Arlene J. Wipfler, *Distributed Processing In The CICS Environment*, pp. vii–xvi, 69–87 and 223–232 (1989).

"STOCKCLERK Inventory Management System," IOBar, Inc. (Copyright 1993).

"Fisher STOCKRO™ Inventory Management System," Fisher Scientific (Copyright 1990).

"Systems By Fisher/Inventory Management System/STOCKPRO™—Single User Version" dated Feb. 28, 1989, pp. 6–1 to 6–14 and 6–21 to 6–26, 7–1 to 7–18, 8–1 to 8–20, 9–1 to 9–6, and 10–1 to 10–8.

"Fisher Scientific PurchasePro," Version 1.1 (Copyright 1994): Introduction, pp. 1–6; File Editors, pp. 1–12; Purchase Requisitions, pp. 1–12; Fastback Orders, pp. 1–8; Reports, p. 1; ReportPro, p. 1.

"LIGHTNING™ Fisher's Electronic Order Entry System," Fisher Scientific (Copyright 1989).

"LIGHTNING™ Order Entry and Information System," Fisher Scientific dated Dec. 1990 pp. 1–6, 19–54 and 91–96.

"Fisher Reliance™ System," Fisher Scientific (Copyright 1989).

*Fisher* 88 Catalog, Fisher Scientific (Copyright 1987) pp. 1536, 1549–1567.

JUST-IN-TIME REQUISITION AND INVENTORY MANAGEMENT SYSTEM

BACKGROUND OF THE INVENTION

This invention generally relates to systems for requisition and inventory management. Requisitioning systems that manage and process purchase orders are well known in the art. One such system—the Fisher Scientific Reliance™ system—has been used by the customers of Fisher Scientific, the assignee of the present application, for some time. Other such systems are described in U.S. Pat. Nos. 4,887,208 and 4,972,318. Such systems generally process purchase orders for items and track a local inventory. These systems employ essentially one-way communications between a terminal or local computer and a host computer to initiate purchase orders; the systems may also manage a local inventory.

Such prior art systems do not, however, provide the capability for effectively managing a Just-In-Time (JIT) inventory site. Many businesses and organizations are seeking to implement JIT inventory stockrooms to make the most efficient use of available space and manpower, while at the same time avoiding costly delays caused by waiting for out of stock items. Supplier and customer organizations will sometimes agree that the supplier will retain ownership of the inventory at the JIT site, which is reserved for subsequent sale to that customer. Other times, they will agree that the customer will own the inventory at the JIT site, but that it will continue to be managed and replenished by the supplier. Frequently, the supplier and customer will establish a JIT site containing some products owned by the customer and others owned by the supplier.

The demands of JIT inventory management are not well met by the requisition and inventory management systems of the prior art. Where the JIT inventory is owned by the supplier, the supplier will generally require access to a database reflecting the contents of the JIT inventory for billing and other purposes. Access to a database reflecting the contents of JIT inventory will also be needed at the customer site to permit effective inventory management. The systems of the prior art do not provide the flexibility necessary to allow both the supplier and a representative at the customer site to access the necessary data. Nor do prior art systems employing essentially one-way communication between a local terminal or computer and a distributor host computer readily provide the customer with up-to-the-minute information regarding the distributor's stock of various items or the status of pending purchase orders. Such information is critical to effective management of JIT inventory.

At least one prior requisitioning system—a predecessor version of the Requisitioning and Inventory Management System (RIMS) described in the present application—has employed two-way communications between local and host computers for processing requisitions. This earlier system has been in use by Fisher Scientific since 1991. Although this earlier system employed a two-way communications link similar to that employed in the preferred embodiment of the present invention, it did not have any capability for managing a local JIT inventory. Indeed this earlier system was merely a system for requisitioning items from a Distributor's usual inventory. Thus this earlier system did not employ a database for tracking a JIT inventory.

SUMMARY OF THE INVENTION

It is an object of this invention to provide a requisition and inventory management system which can effectively process requisitions for items of various types including items available in JIT inventory.

It is also an object of this invention to provide a system for replenishing and managing a JIT inventory.

In accordance with the present invention, a requisition and inventory management system employs both a host computer and a local computer which can be linked to permit two-way data communications in a real time environment. Each computer has an associated database which can be accessed by that computer. By accessing its respective database, each computer can build and transmit to the other computer communications blocks of data relating to a particular requisition of an item in JIT inventory or to the management of the JIT inventory. The other computer can then use the received data to continue processing of the requisition or to update its JIT inventory records. Thus requisition records are created from a real-time interaction between the host and local computers, with each computer using data from its respective database in conjunction with information entered by a Customer Service Representative (CSR) operating the local computer.

The system of the present invention also utilizes means for automatically determining which items in the JIT inventory are likely to require replenishment. The system then proposes a purchase or transfer order for an optimum quantity of the item, which the CSR may accept or modify.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
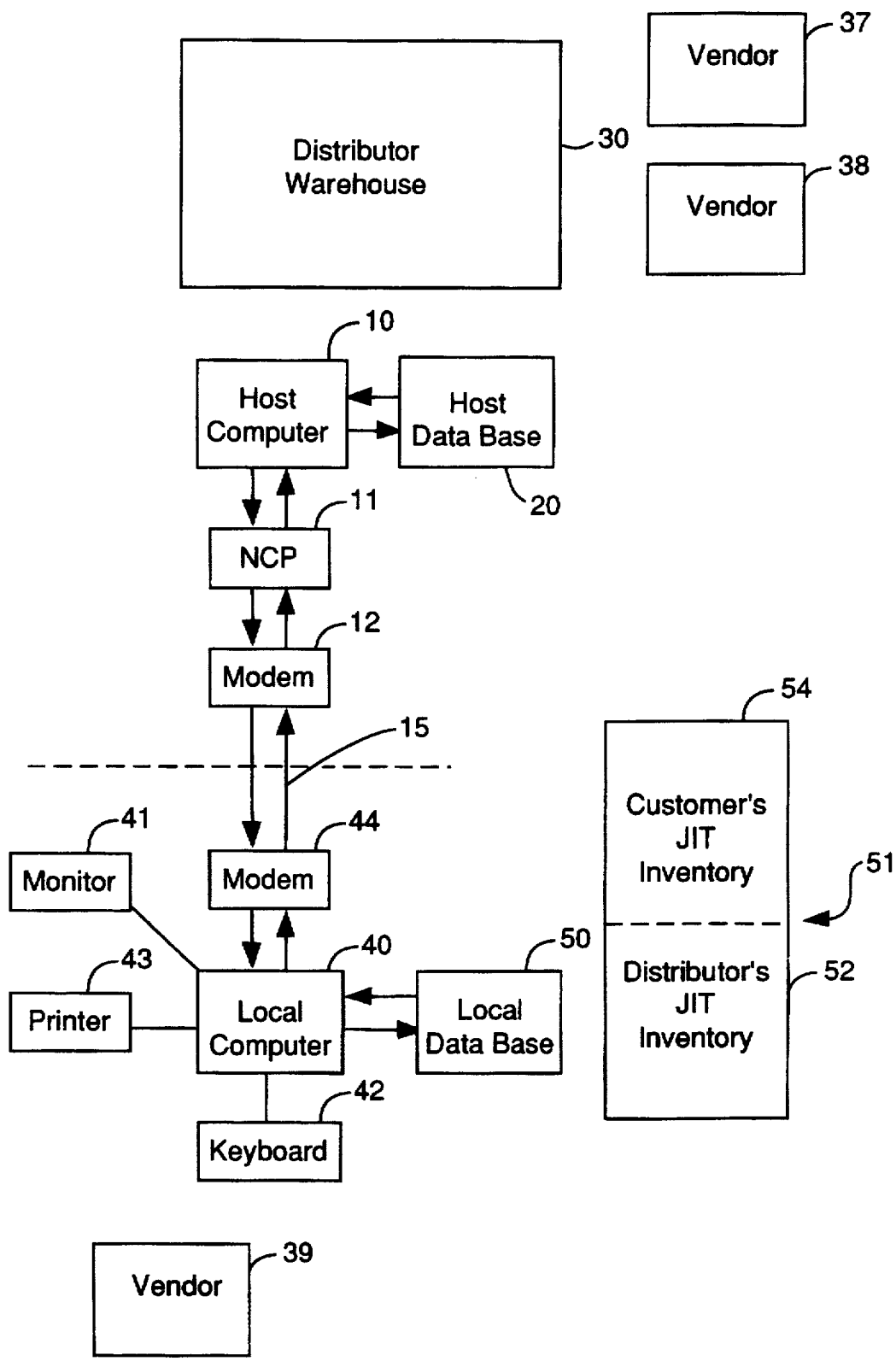
FIG. 1 is a diagram showing the overall system of the present invention and the environment in which it is used.

The requisition and inventory management system of the present invention, which is shown in FIG. 1, employs at least two computers—a host computer 10 located at a Distributor site and a local computer 40 used by a Customer Service Representative (CSR) at or near the customer site and the site of JIT inventory. As will be described below, host computer 10 and local computer 40 are preferably linked in a network employing the formats and protocols of IBM's Systems Network Architecture (SNA).

Most computer 10 can be substantially any mainframe or minicomputer capable of running the desired programs and conducting the required communications. Preferably, the host computer is a mainframe computer (such as an IBM model 3090) running the MVS operating system, the MVS-CICS application and a Virtual Telecommunication Access Method (VTAM) communications network. Host computer 10 controls all inventory, pricing and requisitioning operations of the Distributor's regularly stocked items using host pricing and inventory database 20 (which is actually comprised of several databases, as will be described below) in a manner which is well known to those of ordinary skill in the art. Host database 20 is preferably stored in an appropriate storage device, such as a IBM 3390 disk drive which may employ caching. Inventory portions of database 20 includes data describing the items and quantities thereof available at a particular Distributor warehouse 30 and at other Distributor warehouses. Other portions of database 20 includes item records for each Product regularly sold by the Distributor. Each item record preferably includes information such as Distributor's catalog or part number for the Product, Distributor's list price, Distributor's current cost, Distributor's supplier (vendor) for the Product and a code identifying the Product as part of a product grouping to be treated similarly for customer discounting purposes. Database 20 also preferably includes discount records, by customer, that enable the host computer 10 to calculate at any time a net price for a particular Product to a particular customer in a manner well known to those of ordinary skill in the art. As described below, database 20 may contain cross-references from Distributor's catalog number to its vendor's part number and to similar catalog numbers of other suppliers or distributors for the same Product, either as a part of the item record, in a separate cross-reference file or both.

Database 20 may also include file records identifying the items and quantities thereof of Distributor-owned inventory in various JIT sites at or near the locations of various of Distributor's customers. As described more fully below, such file records for Distributor-owned inventory held for a particular customer (Customer) represent a reflection of similar records maintained by a local computer 40 which manages requisitions and inventory for that Customer.

Database 20 may also include file records for items which Distributor does not routinely supply to all customers, but has agreed to purchase for supply to particular customers, on a special or third party procurement basis. Such file records do not contain a Distributor list price, a discount code or a Distributor catalog number or part number, but will contain other information as described above for regular item records including a vendor, a vendor part or catalog number and a vendor list price.

Local computer 40 is preferably a microcomputer capable of operating the required programs and of transmitting and receiving the required communications, such as an IBM PS/2 Model 80, running the OS/2 operating system and also running the CICS OS/2 application, both of which are available from IBM.

Host database 20 also includes data regarding Distributor's cost prices and vendors for items from third-party suppliers 37 and 38 which are regularly distributed by Distributor to its customers. Host database 20 also includes data regarding items from third-party suppliers 39 whose products the Distributor does not routinely supply to its customers. Distributor may elect to stock in Distributor warehouse 30 some or all of the items of a particular vendor of either type 38 or of type 39.

Local computer 40, which can be any microcomputer or workstation having adequate memory and communications capabilities, preferably includes 8 to 16 megabytes of RAM and a hard disk drive of 300 to 600 megabytes. Local computer 40 also preferably includes a Multi-Protocol Adapter communications card, or a similar communications card, capable of supporting the LU.6.2 communications protocol (available from IBM). Local computer 40 includes a color monitor 41 and a conventional alphanumeric keyboard 42 including twelve function keys F1, F2, . . . F12. Printer 43 is also attached to local computer 43.

In addition to the OS/2 operating system, the hard disk drive of local computer 40 also contains the OS/2 Database Manager, the OS/2 Communications Manager and CICS OS/2 (each of which is available from IBM). The hard disk drive may also contain other conventional utilities useful in setting up and updating the software used on local computer 40. Also on the hard disk drive of local computer 40 is a local database which is diagrammatically represented by block 50 of FIG. 1. Local database 50 is a relational database containing records describing the items and their respective quantities and prices of items currently stored in a Just-In-Time (JIT) facility 51, which may be a separate warehouse, a designated portion of Distributor's warehouse or a stockroom or other room located on a Customer's site. In this embodiment, certain items in the JIT facility 51 are Distributor-owned inventory 52, while others are Customer-owned inventory 54. While the present invention is applicable to the management of inventory at the JIT facility 51 which is all customer-owned inventory 54, in most cases the JIT facility 51 contains only Distributor-owned inventory 52 or contains both types of inventory 52 and 54. Where both types of inventory are present, each Product is usually located in a unique location or bin, but the bins containing Distributor-owned inventory 52 are not segregated from the bins containing Customer-owned inventory 54. Flexibility is preferably provided to redesignate certain products from Distributor-owned inventory 52 to Customer-owned inventory 54, or vice versa, by mutual agreement and transfer of title, without necessarily any movement of the Products from the existing bins.

The host computer 10 is linked to a telephone line 15 via a communication front end processor 11 (such as IBM models 3705 or 3723) running conventional operating software, such as IBM's Network Control Program (NCP) and a modem 12. The host computer 10 is running a VTAM communications network. The local computer 40 is linked to the telephone line via a DCU passthrough box (which may be of the type supplied by Racal Milgo) and is programmed with the Communications Manager application. Data is preferably exchanged between host computer 10 and local computer 40 using the LU.6.2 communications protocol. Using the LU.6.2 communications protocol local computer 40 can create a block of data conforming to a predetermined format which can be transmitted to host computer 10. The host computer 10 can then process the data and create its own block of data containing some or all of the results of that processing. This block of data, which may conform to another predetermined format, can then be transmitted back to local computer 40. Local computer 40 enters a wait state after transmitting a block of data to host computer 10. In this and in other instances where local computer 40 enters a wait state, the CSR can access and run other programs on local computer 40 while in the wait state. Local computer 40 stays in its wait state until it receives a response from host computer 10 in the form of a block of data as described above. This permits what has been called distributed transaction processing whereby two separate programs or tasks on two separate computers engage in a synchronized exchange to accomplish a job between them.

Distributed transaction processing enables host computer 10 and local computer 40 to easily and effectively manage databases having overlapping data content. In the preferred embodiment of the present invention, data describing Distributor's JIT inventory 52 is maintained by host computer 10 in host database 20 and by local computer 40 in local database 50. Each time the local database 50 is modified as to an item in Distributor's JIT inventory 52, the same update must be made to the relevant records on the host database 20. Distributed transaction processing is employed both to make the updates and to insure that the data in the respective databases are in agreement prior to execution of any transaction in the system, such as a purchase order.

In a preferred embodiment of the invention, the system provides requisitioning and inventory management for five distinct product types. The first such product type—type 01—covers products owned by the distributor which are stored at a Just-In-Time (JIT) warehouse either at the customer location or nearby. The present system maintains inventory records for product type 01 products in both local database 50 and host database 20. Another product type—type 03—comprises the items regularly sold by the Distributor, some of which are stored at Distributor's warehouse 30, some of which are regularly ordered by Distributor from vendors such as vendor 37 for direct shipment to any of Distributor's customers. Such regular Distributor products are identified by a Distributor list price and a Distributor part or catalog number (which may be the same, a derivative of or different from the part number associated with the product by vendor 37). Another product type—type 04—comprises items which Distributor does not regularly purchase for resale, but which Distributor can and elects to order from a vendor 38 ( who may be a supplier to Distributor of other products) for sale to particular customers such as Customer. Products of product type 04 can be stocked by Distributor at Distributor Warehouse 30, but are often ordered by Distributor for direct shipment to Customer. Products of product type 05 are those which Distributor does not stock and is unable or unwilling to purchase for the Customer, but which the Customer has arrangements to purchase from an outside vendor 39. The present system has a limited role in Customer's purchase of price type 05 products, primarily of a record-keeping nature. Finally, product type 06 comprises products owned by the Customer and maintained as Customer-owned inventory 54 in the JIT facility 51. Whether replenished by the Customer from Distributor or from an outside supplier, the present system maintains inventory records on product type 06 products in the local database 50, but not in the host database 20. These product types are summarized in Table 1:

TABLE 1

| PRODUCT TYPE | DESCRIPTION |
| --- | --- |
| 01 | Distributor owned item in JIT warehouse located at or near the Customer's site |
| 02 | This price type is not currently used, but has been reserved for |

TABLE 1-continued

| PRODUCT TYPE | DESCRIPTION |
| --- | --- |
|  | Distributor-owned items in Distributor's warehouse 30 which have been segregated in some fashion for a particular Customer. |
| 03 | Distributor catalog item; stored in Distributor's warehouse |
| 04 | 3rd party item that Distributor orders |
| 05 | 3rd party item which CSR or Customer orders |
| 06 | Customer owned item located in Customer warehouse at or near Customer site |

Requisitioning

Figure 2A:
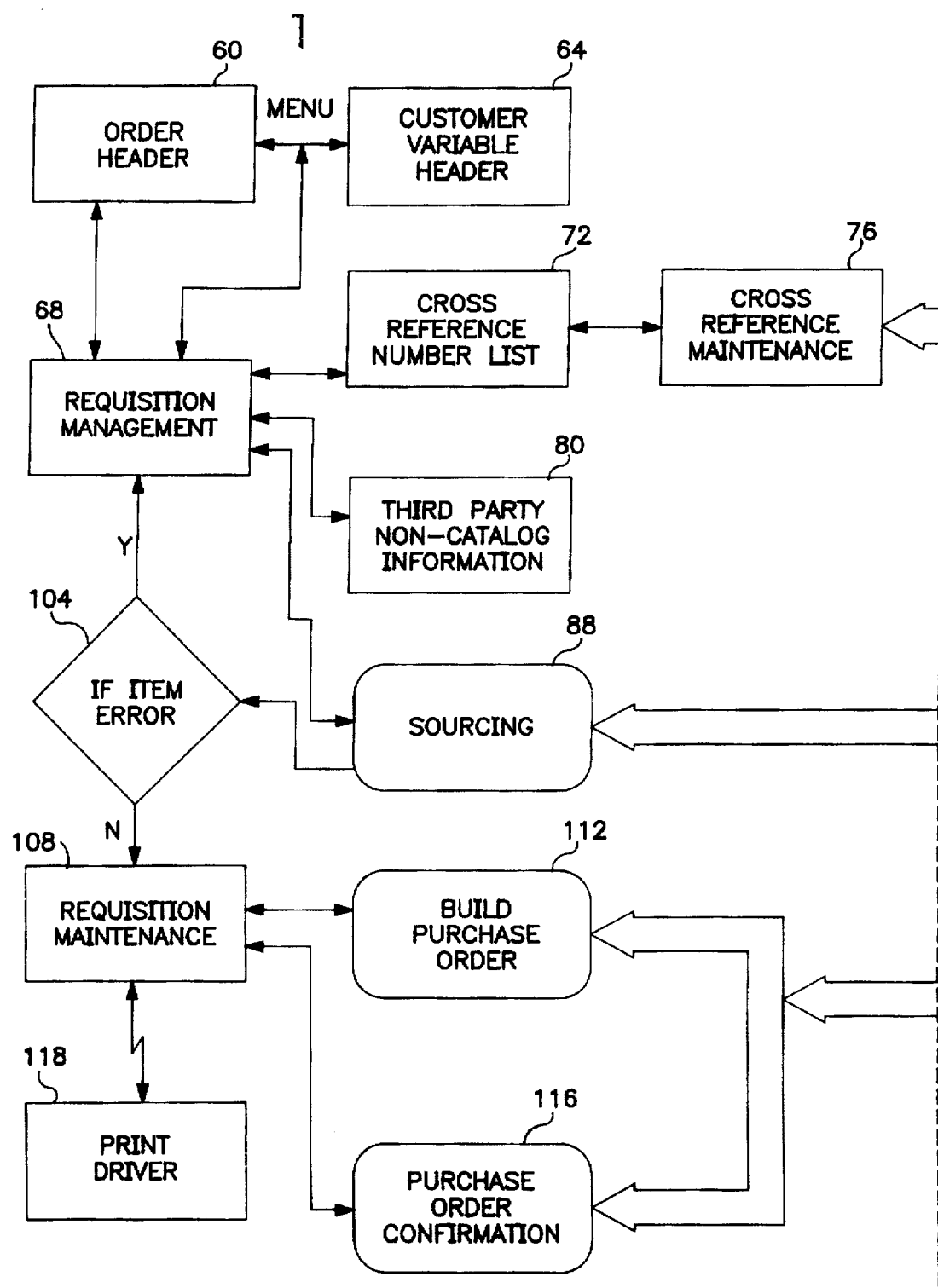
FIGS. 2A and 2B are diagrams showing the flow of control and interaction between the various programs and data screens of the local computer and the programs of the host computer used for requisition management in an embodiment of the system of the present invention.
Figure 2B:
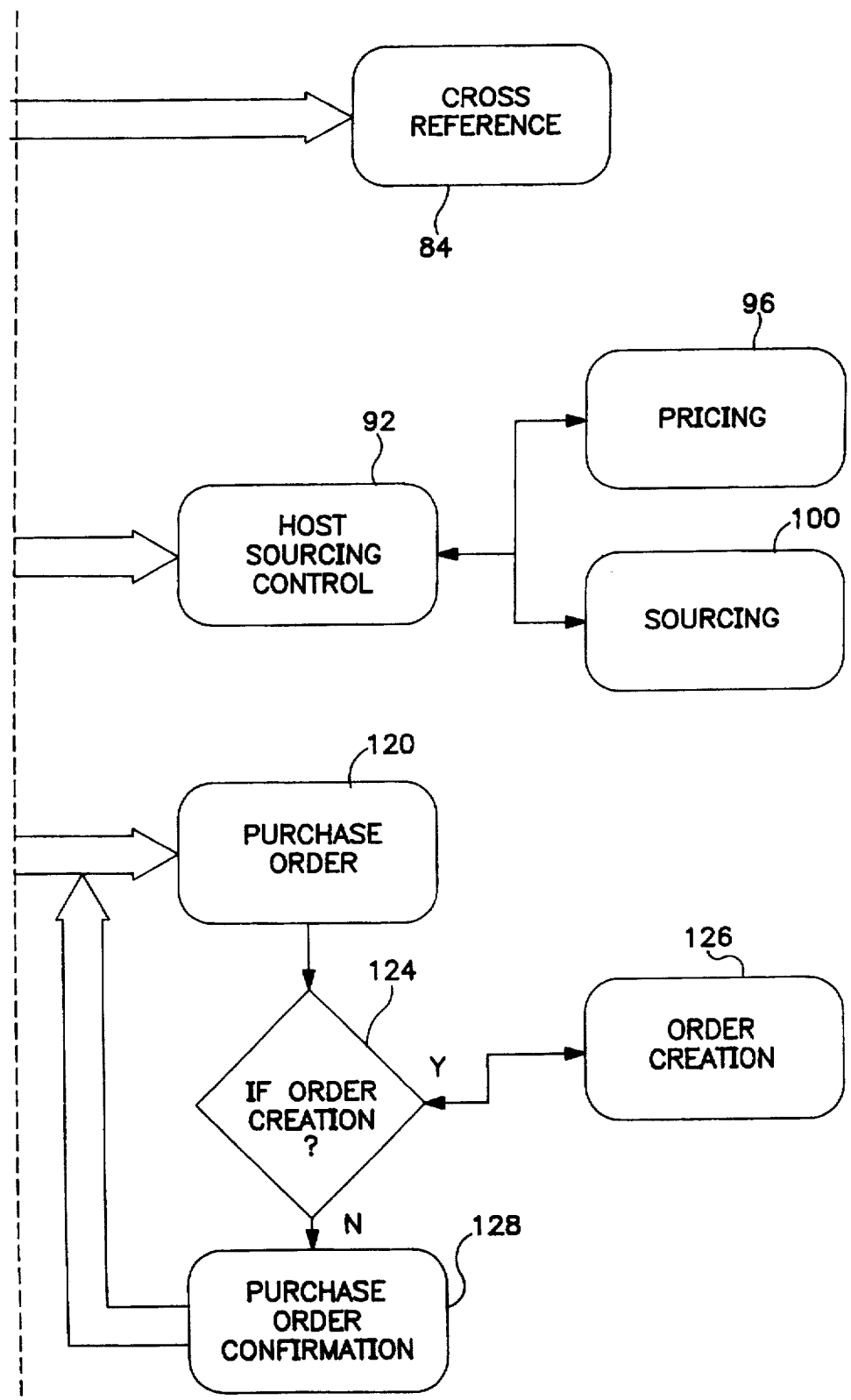

Requisitioning on the system of the present invention is described in FIGS. 2A and 2B. In FIGS. 2A and 2B, the diamonds represent decisions. The rectangles represent data screens as well as programs associated with those data screens. The rounded rectangles represent programs not associated with data screens such that, while these programs are running, the prior data screen may remain visible without, necessarily, being operational for the input of data. The programs associated with the data screens enable the CSR to display and modify the contents of various tables associated with particular data screens. These tables make up local database 50, which can be any relational database.

As the data (e.g., Account Number, Requisition Number and Stock Numbers) associated with a single requisition are entered through the various data screens on local computer 40, that computer creates a set of Requisition Tables (a Requisition Header Table and a Requisition Item Table) for that particular requisition. The Requisition Tables are stored in local database 50, and can be accessed by local computer 40 using the Requisition Number to find the desired table.

The CSR will ordinarily receive a written or oral request from an employee of the Customer to requisition one or more items. For example, a laboratory technician may approach the CSR with a list of supplies to withdraw from an on-site JIT stockroom. In some forms of the invention, such a requisition request can be received by local computer 40 in electronic form through the customer's host computer (not shown on FIG. 1), through a telephone line or in electronic media such as a floppy disc. The first step in creating a requisition involves entry by the CSR of information in the Order Header data screen 60 in FIG. 2A. A sample of an actual Order Header data screen is set forth Table I. Generally, the CSR need only enter the Account Number and a Requisition Number. Hitting the ENTER key after entering the Account Number (which is the Distributor's designation for the customer department for which the requisition is placed) will automatically cause the correct Name and Address associated with that Account Number to be entered into the appropriate fields of data screen 60. Local computer 40 accomplishes this by comparing the entered Account Number to a table of account number records in local database 50 which contains certain basic information associated with each Account Number record stored therein. This database table has been previously created by the CSR using the associated Customer Account Maintenance data screen, a sample of which is shown in Table XIII.

A Requisition Number is also required for each requisition. The CSR must also enter this information in the appropriate field of the Order Header data screen. The requisition number can be the customer's own internal requisition number, or can be any unique number assigned to the requisition by the CSR. Various additional information may also be inputted, such as the name of the person needing the items ordered in the requisition, the name of the person who called the CSR to place the requisition, etc.

The ORDER TYPE field on Order Header data screen 60 can have one of three values: "R" for an ordinary Requisition; "T" if the requisition was generated to replenish Customer-owned JIT inventory 54, as will be discussed below; and "G" if the order is for returning JIT inventory to JIT facility 51, as will be discussed below. The ordinary Requisition order type ("R") is the default.

At the bottom of the screen are several fields which describe the function of various function keys (e.g., F1, F2 etc.). In this data screen, the CSR can preferably obtain help online by hitting the F1 key. The online help facility functions in a conventional manner that will readily be understood by those of ordinary skill in the art. Hitting the F3 key would permit the CSR to quit the program; hitting F4 would erase the contents of any of the fields into which data had been previously entered to permit a new requisition to be entered. Hitting F11 would permit the CSR to change the requisition number to enter a new requisition. Hitting F12 permits the CSR to cancel an open requisition.

Function keys F2, F5 and F6 all cause the system to jump to a new program or data screen. F2 causes the program to jump to Requisition Management data screen 68 as shown in FIG. 2A. Hitting F6 will cause the system to enter the sourcing program 88 shown in FIG. 2A, provided that the CSR has already entered the necessary information on the Order Header data screen 60 and one or more items on the Requisition Management data screen 68, as will be discussed below. If the CSR has just begun the requisition (and has not yet entered at least an Account Number, a Requisition Number and at least one item), then hitting F6 will have no effect. Because the CSR will not ordinarily initiate sourcing program 88 from Order Header data screen 60, no arrow is shown in FIG. 2A linking these programs.

It should be noted that function keys (F1, F2 etc.) are not the only means for directing the flow of the program shown in FIG. 2A. Each data screen and program also has a unique four character identification code. To go directly to a particular data screen or begin a subroutine, the CSR can enter the associated code into the RESPONSE field shown on any data screen along with any necessary parameters, which are entered in the KEY(S) field. For example, to Fast Path to Cross Reference Maintenance data screen 76, the CSR can enter the code CRNL into the RESPONSE field.

If the CSR hits the F5 key from Order Header data screen 60, the system jumps to the Customer Variable Header data screen 64 and associated program as shown in FIG. 2A. An example of a Customer Variable Header data screen 64 is set forth at Table II. This data screen allows the CSR to enter and edit information that the particular customer desires to be associated with the requisition due to requirements of the customer's internal accounting system or other systems. Examples of such customer variable information might be the names (or identification codes) of various customer divisions or customer projects. The CSR can define any desired fields for the Customer Variable Header data screen in the manner set forth below. Thus the Customer Variable Header data screen may contain one or more data fields into which the CSR may enter and edit data, such as a division name or identification code, of interest to the Customer but not, necessarily, to Distributor. This variable information is useful in preparing data sets such as Requisition summary reports, status reports, financial reports and the like which can be loaded periodically on request into the Customer's own host computer, either as a flat file or in a customized form.

If the CSR hits the F2 key from the Order Header data screen (or the F4 key from the Customer Variable Header data screen) the program jumps to Requisition Management data screen 68 in FIG. 2A. A sample Requisition Management data screen is set forth at Table III. The CSR uses this data screen to enter the catalog or stock numbers and quantities of the various items being ordered.

The Account Number and Requisition Number are automatically passed to Requisition Management data screen 68 and displayed at the top of the Requisition Management data screen 68 in the relevant fields. The CSR can now enter the items and quantities for the requisition. The item is identified by entering the Distributor catalog number of the desired item in the field below the STOCK NBR label on the appropriate line number in Requisition Management data screen 68. In the sample screen shown in Table III, the stock number A181 has been entered in the STOCK NBR field of line 001.

The CSR may also enter an item by using a catalog or reference number from a third-party supplier other than the Distributor where the same item has both Distributor and third-party catalog numbers (which are necessarily different). In the preferred embodiment, most records in local database 50 identify products by a stock number or part number compatible with the Customer's record-keeping system. Part Master records (see Table VI) also contain a manufacturer or supplier's catalog or part number, which will be the number used on purchase orders and, for product types 01 and 03, will be the Distributor's catalog or part number. The local database 50 contains a cross-reference file between such stock numbers and a particular supplier's catalog or part number. The creation of this cross-reference file by the CSR is described below.

Figure 3:
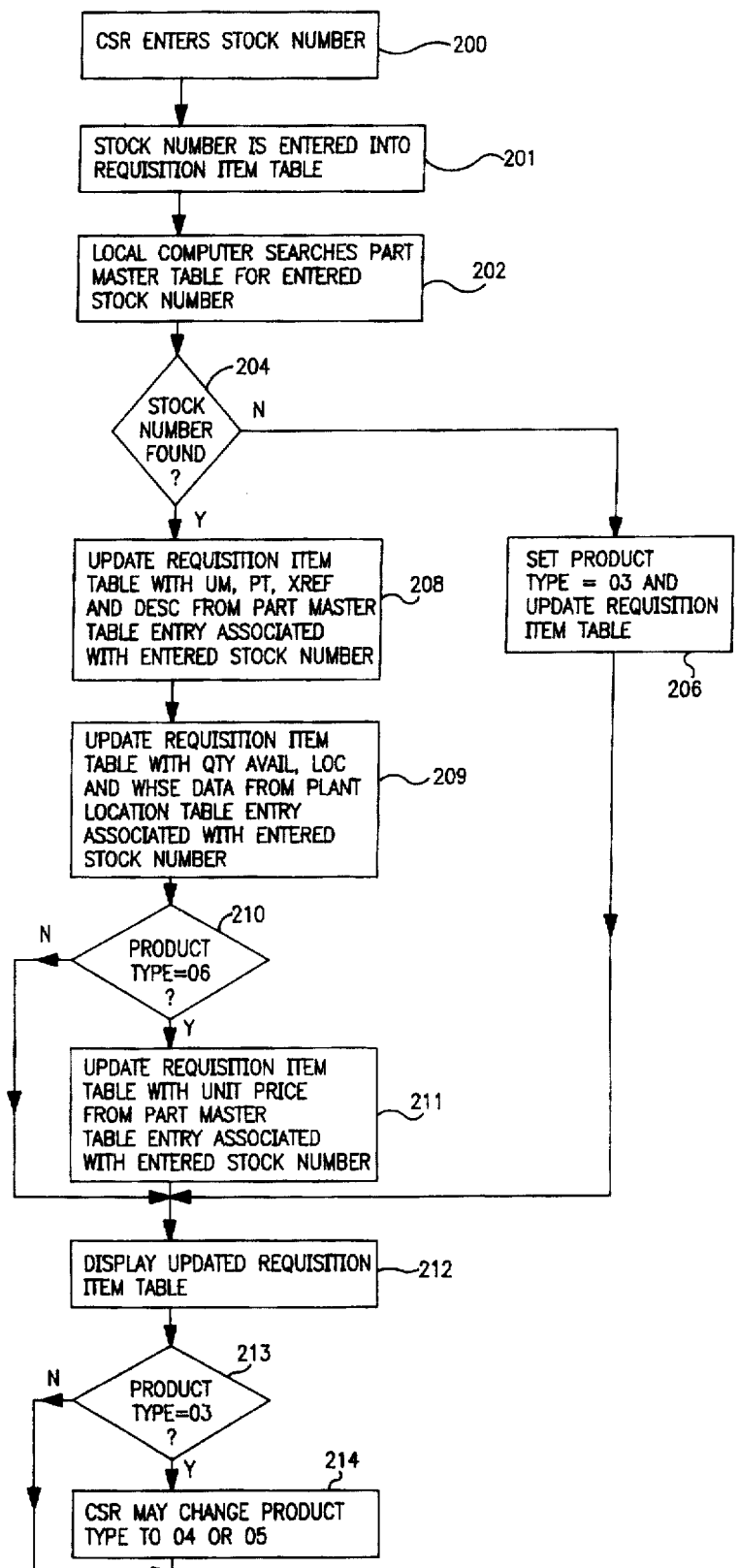
FIG. 3 is a flowchart describing a program employed by a local computer in an embodiment of the system of the present invention to associate a product type with an item code which has been entered by the CSR.

When the CSR enters an item code in the STOCK NBR field and hits the ENTER key, local computer 40 begins a program described in the flowchart is shown in FIG. 3. The entered stock number appears on the data screen as it is being entered. In step 201, the entered stock number is added to the appropriate field of the Requisition Item Table in local database 50 along with the associated line number. In step 202, local computer 40 searches the Part Master Table in local database 50 for the STOCK NBR that has just been entered (which can be either the Customer's stock number or a valid cross-reference number such as a Distributor catalog number). (A description of how the Part Master Table in local database 50 is created by the CSR is set forth in detail below.) If the stock number is not found the Part Master Table in local database 50, as indicated in steps 204 and 206, the product type field defaults to product type 03. The display on the Requisition Management data screen 68 is then updated to reflect this information (the PT field displays "03") as shown in step 212. As described below, such designation of product type 03 will be verified during the Sourcing steps using the product records and cross-reference files contained in host database 20.

If, on the other hand, the entered stock number is found in the Part Master Table in local database 50, as indicated in steps 204 and 208, the Requisition Item Table in local database 50 is updated with the following information from the entry in the Part Master Table associated with the relevant stock number: the default unit of measure; the product type; the cross-reference number, if any; and a text description of the item. In step 209, Requisition Item Table is updated with the following information from the entry in the Plant Location Table in local database 50 associated with the relevant stock number: the quantity of the item available in the Customer-owned inventory 54 in the JIT facility 51 (for product type 06) or in the Distributor-owned inventory 52 in the JIT facility 51 (for product type 01); a description of the location of the item in the relevant stockroom or warehouse (e.g., by aisle and shelf); and a code identifying the relevant stockroom or warehouse. In steps 210 and 211, the Unit Price is added to the Requisition Item Table if the product type is 06. (The Plant Location Table is created and updated using the Plant Location data screen, a sample of which is set forth in Table VII.)

In the system of the present invention, a particular stock number will preferably be either Customer-owned (product type 06) or Distributor-owned (product type 01) in the local JIT, but not both. Thus a given stock number may or may not have a corresponding entry in the Part Master (or Plant Location) Table in local database 50; but, if a record exists there, there will be at one time only one record associated with the stock number. Thus, stock stored in the JIT facility 51 of one product (whether in a single bin or in multiple bins), will either be all customer-owned or all Distributor-owned. Customer and Distributor may, however, decide at any time to redesignate particular products from Customer-owned to Distributor-owned (with corresponding change of ownership and debit or credit to the applicable accounts). Such a change can be reflected in local database 50 using the Part Master, Plant Location and Inventory Adjustment data screens (samples of which are set forth in Tables VI, VII and VIII, respectively), without necessarily moving the inventory physically within the JIT facility 51.

In the instance where the stock number is found in the local database 50, the display of data screen 68 is then updated in step 212 by displaying: the default unit of measure (in the UM field); the product type (in the PT field); the cross-reference number, if any (in the XREF field); the list price of the item, if the product type is 06 (in the UNIT PRICE field); a text description of the item (in the DESC field); the quantity of the item available in the JIT facility 51 as Customer-owned inventory 54, product type 06, or as Distributor-owned inventory 52, product type 01 (in the QTY AVAIL field); a description of the location of the item in the relevant stockroom or warehouse (in the LOC field); and a code identifying the relevant warehouse (in the WHSE field).

At this time, if the product type is shown to be type 03, the CSR may edit this field to change the product type to 04 or 05, as shown in steps 213 and 214 of FIG. 3 if the CSR knows that the item is not regularly available from Distributor as a routine item. This editing will change both the displayed product type and the value of the product type field in the applicable field of the Requisition Item Table. Local database 50 includes as product type 01 items only a subset of the entire set of Distributor catalog items. Thus, in step 206, local computer 40 assigns a product type 03 by default to any item number which is not determined to be a product type 01 or 06—i.e., for which a Part Master record is not found in local database 50. As described below, host computer 10 will verify the 03 status for such products during sourcing and communicate information to local computer 40 to establish an error code for such 03 status if not found in host database 20. If the CSR fails to change the product type for an item which host computer 10 is unable to identify as a Distributor catalog item, an error will result during sourcing when host computer 10 attempts to source the item. This error will be handled as discussed below.

The CSR can then enter the quantity of the item being requisitioned in the field below the QTY label in Requisition Management data screen 68. The entered quantity will be displayed on data screen 68 and this data will be entered into the appropriate field of the Requisition Item Table in local database 50. The unit of measure associated with this quantity is defined by the value in the UM field. In the example shown in Table III, this field is occupied by "EA," meaning that the unit of measure is a single unit for A181 (a single one liter bottle of acetone). This is the default unit of measure for this item and is the unit in which all records and computations are performed. An alternate unit of measure is preferably also provided (as is the case for many of the products in host database 20), which is a multiple of the standard unit (e.g., a "CS" or case of six such bottles of acetone). Within the Part Master Table, a unit price is maintained, but only for product type 06 will a unit price be displayed at this stage as indicated in steps 210 and 211 (during requisition management and before sourcing).

The CSR may use as many lines of the Requisition Management data screen 68 as are necessary to complete the requisition (up to a preset or default limit set by the system, e.g., 200 lines; or to a lower limit set by the CSR, e.g., 100 lines). Keys F7 and F8 allow the CSR to page forward and backward on Requisition Management data screen 68; the F9 key provides the next available line number at the top of the list of items (giving the CSR a new screen to work with). Hitting the F4 key creates a new requisition (to which the CSR must assign a new requisition number) with the same Customer Account Number and the associated address information. The F5 key causes a customer variable item data screen to be displayed, which enables the CSR to enter information that the customer desires to have associated with a given item. With the exception of the F10 key, the functions of the remaining function keys will be clear from the previous discussion.

Hitting the F10 key calls the Non-Catalog Information data screen 80 onto the screen of monitor 41. An example of a Non-Catalog Information data screen 80 is shown in Table V. This data screen is used to enter additional information about items not regularly sold by Distributor (for which host database 20 contains a Distributor catalog number and list price), but which are available as third-party purchases by Distributor (product type 04) or as administrative purchases by Customer (product type 05): e.g., the identification of the third party vendor (by number and name), the vendor's part number, the vendor's offered price and other information shown in Table V. If the CSR has previously created a cross-reference entry in the Cross Reference Table (using Cross Reference Maintenance data screen 76) for the item, some or all of the information on Non-Catalog Information data screen 80 will be automatically filled in using the data associated with that stock number (of the vendor) in the Cross-Reference Table in local database 50. Information associated with products of type 04 will, to at least some extent, be shared with the host computer 10. Information associated with type 05 products will, for the most part, not be shared with the host computer 10. Nevertheless, records about both types of products are maintained in local database 50 and are available for flat file and other information transfers to the Customer's host computer.

For items of product type 04, the Distributor will order the item for the customer and have it sent to the customer. Consequently, the following information must be entered on the Non-Catalog Information data screen 80 for items of product type 04: vendor stock number and the vendor number (which corresponds to a particular vendor). These data are forwarded to the host computer 10 to be checked against or added to host database 20 (for products of price type 04, but not for products of price type 05). An error will result in "sourcing" this order if this information is not provided by the CSR or does not correspond to information in host database 20 for a non-catalog item.

For items of product type 05, the CSR will create an order record or document ordering the item on behalf of the customer or confirming an order placed on behalf of the customer (e.g., by telephone to the designated vendor).

For items of product type 05, the CSR may order the item for the Customer. These orders are not placed or filled using the system of the present invention, although data regarding these transactions may be entered on Non-Catalog Information data screen 80 to record these transactions. Instead, either the proposed purchase order record is uploaded into the customer's computer for processing or a document is printed at local printer 43 for signature and action by the customer's purchasing agent or the CSR confirms that the order has been placed with the designated vendor by some other means.

Sourcing

After all of the items for a requisition have been entered, the next step is that of sourcing the requisition. Sourcing the requisition is the process of determining what inventory will be used to fill the requisition. Pricing is also performed in this step when it is called for (e.g., for all product types except for 05 and 06).

Sourcing, which is represented by step 88 in FIG. 2, is initiated by hitting the F6 key from the Requisition Management data screen 68 (or from Order Header data screen 60 or Non-Catalog Information data screen 80.)

Sourcing is performed on both local computer 40 and host computer 10. Sourcing in the preferred embodiment of the system of the present invention can involve up to four different product types: 01—local Distributor-owned JIT items; 03—Distributor catalog items; 04—third-party items which are ordered by the Distributor; Type 06—Customer-owned JIT items. (Product type 05 comprises third-party items which are not sourced by the system of the present invention.) Any particular requisition may involve all of these product types, only a single product type, or any combination of product types.

The product type which was determined when the STOCK NBR was entered on the Requisition Management data screen is now used to source the item. Items of product type 06 are sourced from the Customer-owned Inventory 54; items of product type 01 are sourced from Distributor-owned inventory 52.

Sourcing for each item in the Requisition Item Table will be described in connection with FIGS. 4A through 4D. In step 220, the CSR hits the F6 (Source) key from Requisition Management data screen 68. In steps 221 and 224, the system checks the product type (in the PT field) of the item and routes control of the program according to that product type. If the item is of product type 03 or 04, control passes through point A 222 to the diagram shown in FIG. 4C. If the item is of product type 01 or 06, control passes to block 228. If the item is of product type 05, control passes to point B 226. The processing of transactions of product type 05 by the preferred embodiment of the system of the present invention is of a record keeping nature. In the steps represented by point B 226, the CSR enters the relevant data regarding the transaction and the data are stored in local database 50 in the same manner as data relating to the other product types described herein. The data may then be uploaded periodically to the Customer's host computer.

In the case where the item has product type 01 (an item owned by Distributor in JIT facility 51), local computer 40 will prepare and send to host computer 10 a block of data including the stock number (STOCK NBR), product type (PT), warehouse location code (LOC), the requisitioned quantity (QTY), the quantity available at the JIT facility 51 and header data, as shown in step 230. The header data includes at least the account number and requisition number. Local computer 40 then waits for host computer 10 to transmit a block of data in response to the transmission of local computer 40, as shown in step 232. Local computer sends the block of data via the communication linkage described in connection with FIG. 1.

Figure 4A:
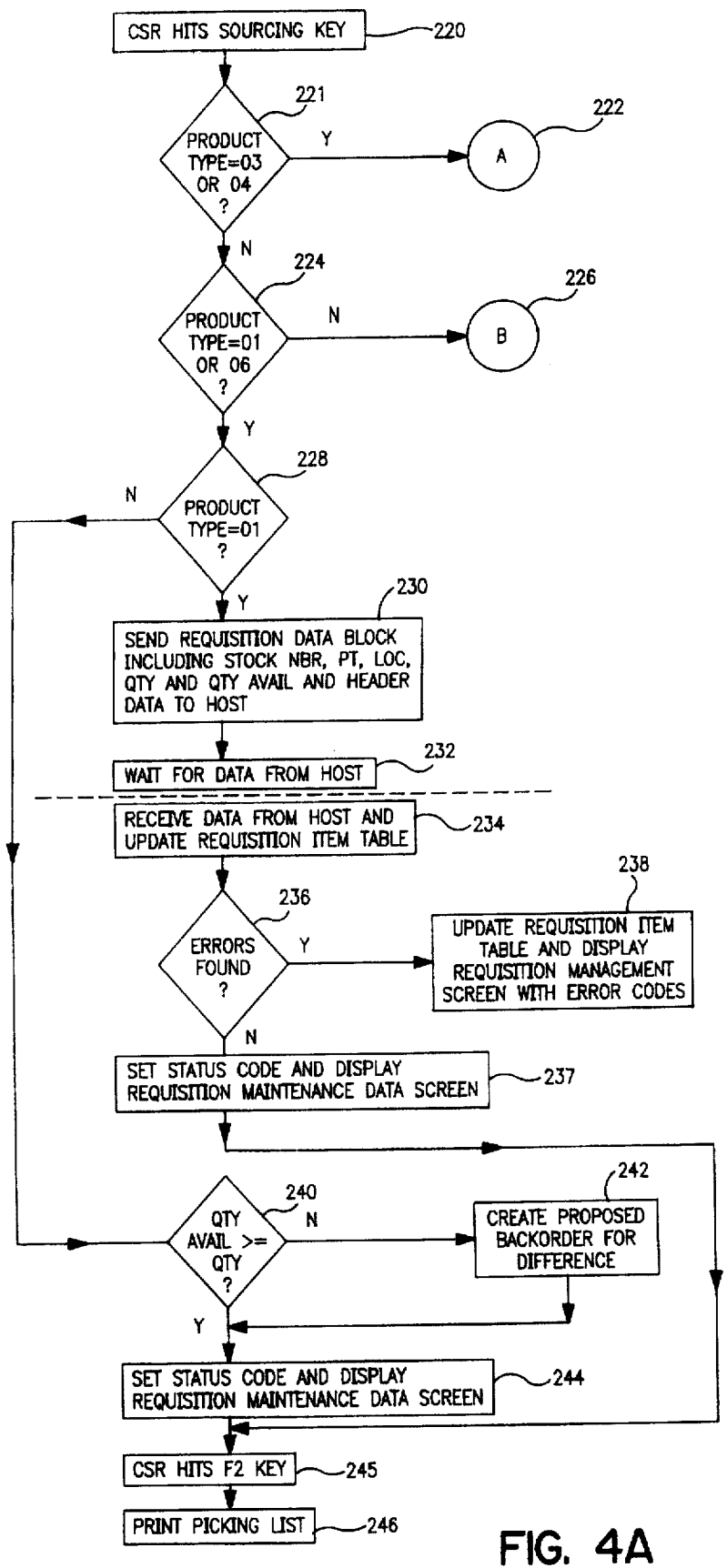
FIGS. 4A through 4D are flowcharts describing programs employed by an embodiment of the system of the present invention to source requisitioned JIT inventory owned by either the distributor or the customer, other inventory owned by the Distributor, and inventory owned by other vendors.
Figure 4B:
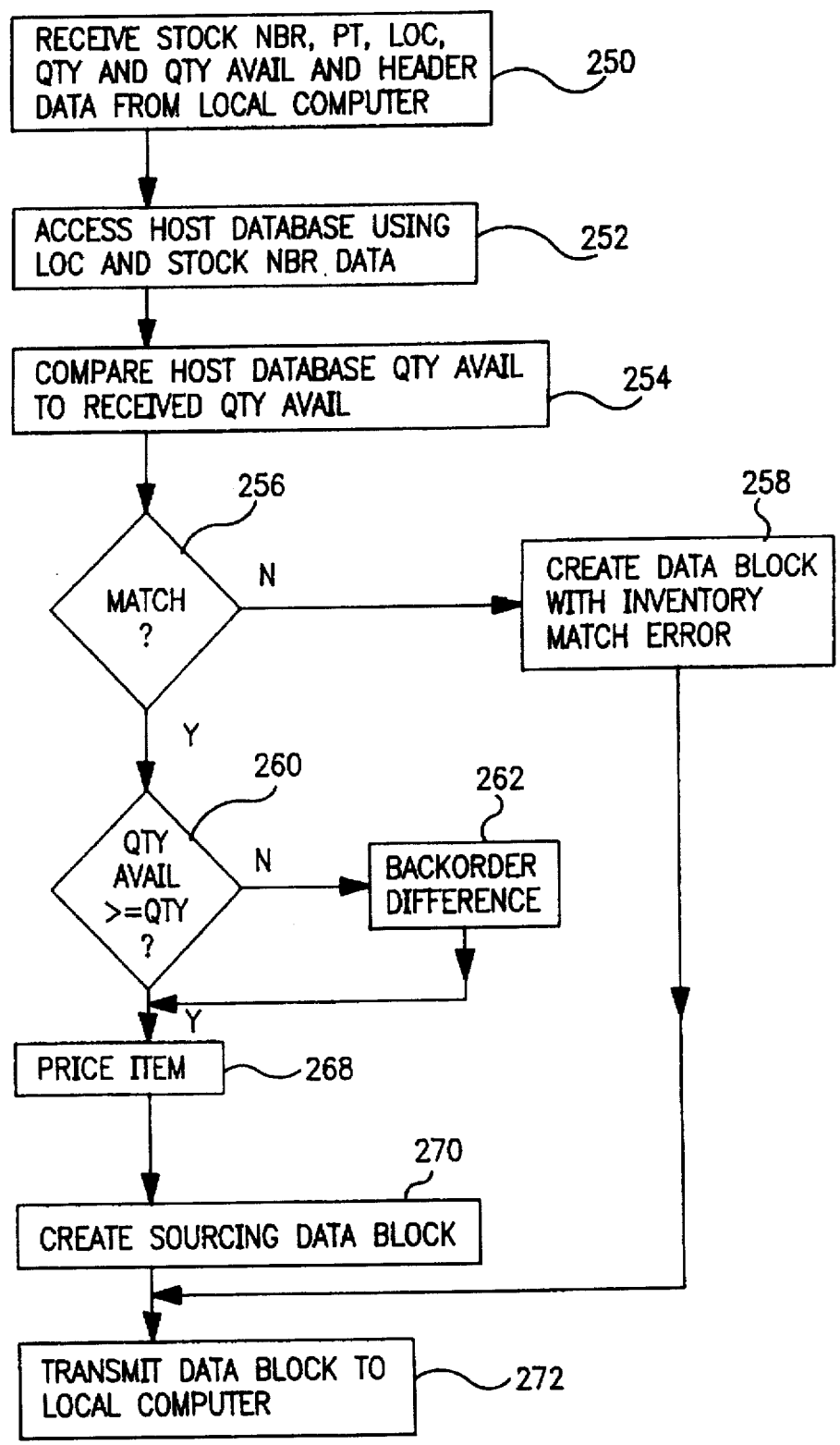

At host computer 10, the data sent by local computer 40 is received as shown in step 250 of FIG. 4B. Most computer 10 first uses the warehouse location code (LOC) and the stock number (STOCK NBR) to access host database 20 to determine what the host's records show for the quantity available at the relevant location for the item being requisitioned, as shown in step 252. The host's quantity available is compared to the received quantity available (QTY AVAIL) to determine if they match, as shown in step 256. If the quantities are not the same, host computer 10 creates a data block including an inventory match error code, as shown in step 258. This data block will then be transmitted back to local computer 40 via the communication link, as shown in step 272. This insures that the host and local databases are in agreement as to the quantity of an item in JIT facility 51 which is owned by the Distributor.

If, however, the host computer's 10 quantity available does match that in the received QTY AVAIL field, in step 256, host computer 10 then determines if the quantity available (QTY AVAIL) is equal to or exceeds the requisitioned quantity (QTY), as shown in step 260. If the quantity available is equal to or exceeds the quantity requisitioned, host computer 10 then prices the item, as shown in step 268 (using the program represented by block 96 of FIG. 2B). Any conventional algorithm or data structure may be employed by host computer 10 for determining the net price per unit of a particular Distributor product sold to a particular Customer as shown in step 268. Such pricing may be based, for example, on Distributor's list price and a percentage discount off that list price negotiated between Distributor and Customer and recorded in host database 20 for that product type. As is described below, the net price per unit is sent from host database 20 through the communications link to the local computer 40 for entry into a previously blank field in the Requisition Item Table.

If the quantity available is determined to be less than the quantity requisitioned in step 260, host computer 10 then creates a warning message indicating a proposed backorder for a quantity equal to the difference between the quantity requisitioned (QTY) and the quantity available (QTY AVAIL). As will be discussed below, the CSR need not accept this backorder. Host computer then proceeds with pricing step 268.

After pricing is complete, host computer 10 creates a data block including the information regarding any backordered quantities of the item and the net price per unit of the item, as shown in step 270. This data block is then transmitted to local computer 40, as shown in step 272.

In block 234 of FIG. 4A, local computer 40 receives the data block transmitted from host computer 10. Local computer 40 will preferably remain in wait state 232 for only a fraction of a second, so that the display on monitor 41 will appear to be updated almost instantaneously to the CSR. The data (relating to pricing and backorder quantity) received from host computer 10 is then used to update the relevant line entries in the Requisition Item Table as shown in step 234. If an error code is found in the received data, local computer 40 displays Requisition Management data screen 68 with the relevant error code. A list of the various error codes and warning codes which local computer 40 can cause to be displayed is attached at Table XXIV. Only some of the three digit codes are applicable to the Requisition Management data screen 68. The CSR may now take steps to reconcile the values of stock on hand in JIT facility 51 for the requested item of product type 01 before sourcing of the line can proceed further. (For example, the CSR may attempt to adjust the inventory for this product, as will be described in detail below.)

If no error codes are found in the transmitted data, local computer 40 will display Requisition Maintenance data screen 108 on monitor 41 as shown in step 237. (A sample Requisition Maintenance data screen is set forth in Table IV.) Requisition Maintenance data screen 108 will display the price transmitted by host computer 10 (UNIT PRICE) and any quantity which host computer 10 has proposed to place on backorder (QTY BCKORD). In addition to displaying the relevant quantities in the Requisition Item Table, local computer 40 also assigns a status code to each line of a requisition and displays it in the STATUS field in Requisition Maintenance data screen 108. The possible status codes and the algorithm for assigning them to a line of a requisition will be discussed in detail below.

If the entire requisition has been sourced, control then passes to block 245, where the system will cause a picking list to be printed out (as shown in step 246) on printer 43 if the CSR hits the F2 (Accept) key. This completes sourcing for an item of product type 01.

For items of product type 06 (an item owned by the Customer in JIT facility 51), sourcing does not require communication with host computer 10. Thus control in FIG. 4A passes from block 228 to block 240, where local computer 40 determines whether the quantity of the item requisitioned (QTY) is equal to or exceeds the quantity available (QTY AVAIL). If the quantity available is determined to be less than the quantity requisitioned in step 240, local computer 40 then creates a proposed backorder in step 242 for a quantity equal to the difference between the quantity requisitioned (QTY) and the quantity available (QTY AVAIL). As will be discussed below, the CSR need not accept this backorder. Local computer 40 then proceeds with step 244 (as it would if the quantity available is equal to or greater than the quantity requisitioned.)

In step 244, local computer 40 display Requisition Maintenance data screen 108 on monitor 41, which will display any quantity which local computer 10 has proposed to place on backorder in addition to the relevant data in the Requisition Item Table. Local computer 40 also assigns a status code to each line of a requisition and displays it in the STATUS field in Requisition Maintenance data screen 108. Control then passes to block 245, where the system will cause a picking document to be printed out (as shown in step 246) on printer 43 if the CSR hits the F2 (Accept) key. This completes sourcing for an item of product type 06.

The picking list can be used by suitable personnel to pick the required items of product type 01 or 06 from JIT facility 51. The quantities picked are then entered onto the picking document and compared by the CSR to the quantities shown. If the quantities agree, the CSR can accept the order by hitting the F2 key again, as will be discussed below.

Thus sourcing for product types 01 and 06 is similar except that, for product type 06, there is no verification with the host computer 10 as there is with product type 01.

Figure 4C:
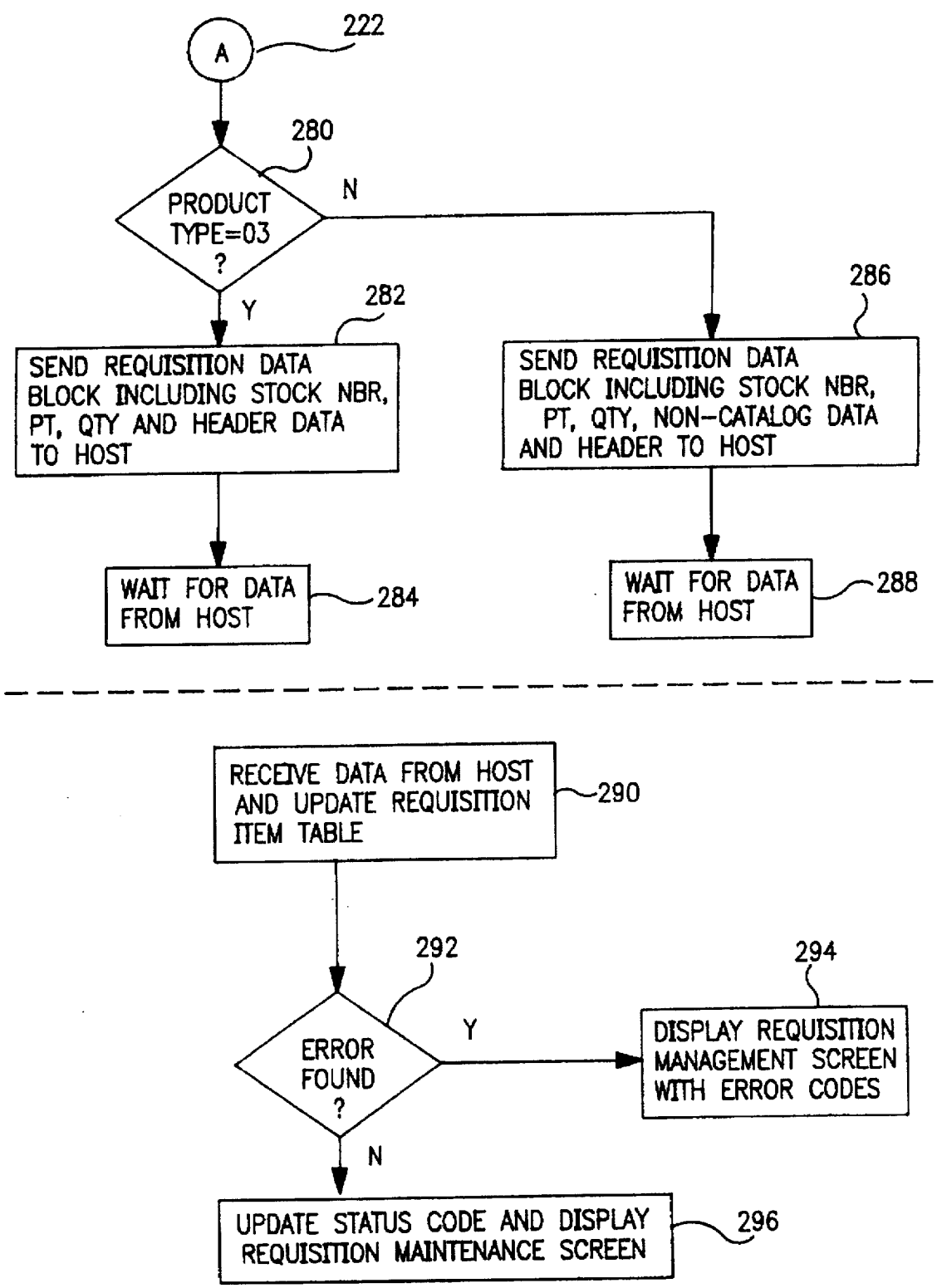
Figure 4D:
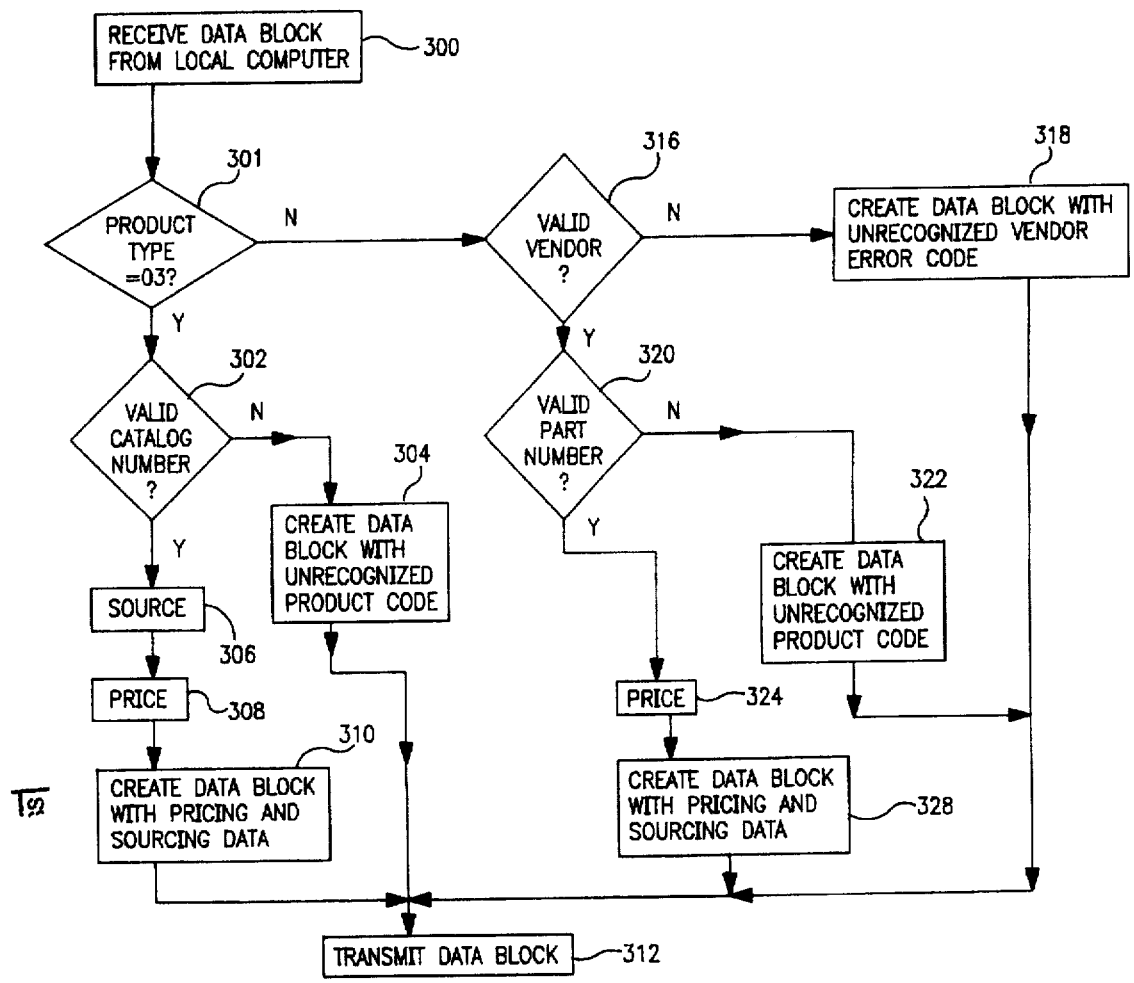

The steps performed in the sourcing of product types 03 and 04 are described in FIGS. 4C and 4D. If local computer 40 determines that the items in a requisition line being sourced have product type 03 or 04, control passes from block 221 in FIG. 4A through point A 222 to decision block 280 shown in FIG. 4C. If the product type is 03, control then passes through decision block 280 to block 282. In block 282, local computer 40 creates and sends to host computer 10 a data block containing the stock number, product type (which is 03 in this case), quantity requisitioned and header information as discussed in connection with the sourcing of product type 01. Local computer 40 then waits for data to be received from host computer 10 as shown in step 284.

If, on the other hand, the product type is 04, control then passes through decision block 280 to block 286. In block 286, local computer 40 creates and sends to host computer 10 a data block containing the stock number, product type (which is 04 in this case), quantity requisitioned, non-catalog item data (the vendor number and the vendor catalog number of the item) and header information as discussed in connection with the sourcing of product type 01. Local computer 40 then waits for data to be received from host computer 10 as shown in step 288.

The sourcing of product types 03 and 04 at host computer 10 is described in connection with FIG. 4D. In step 300, host computer 10 receives a data block from local computer 40. By accessing the product type (PT) field for a given line in a received block of requisition data, host computer 10 can readily determine the product type of that line. Assuming that the line is of product type 03, control passes through block 301 to decision block 302. In block 302, host computer 10 determines if the received stock number (STOCK NBR) for the line of requisition data block being processed is a valid Distributor catalog number. Host computer 10 performs this action by comparing the stock number (STOCK NBR) to series of databases described below in connection with cross referencing containing all valid catalog numbers which are stored in host database 20. If the stock number is not recognized, host computer creates a data block with an unrecognized product error code in step 304. This data block is transmitted to local computer 40 in step 312.

If, however, the stock number is recognized as corresponding to a valid Distributor catalog number, host computer 10 sources (using the transmitted QTY) and prices the line of the requisition in steps 306 and 308. Sourcing may be performed in a conventional manner. Host computer 10 has access to host database 20 which includes information regarding the price and quantity available in the Distributor Warehouse 30 and each other Distributor Warehouse of each particular item stocked by the Distributor. Host database 20 also includes coding for items to be direct-shipped from a regular vendor 37. For pricing, the Distributor may employ a separate discount table for each customer account, to automatically provide net prices of items that have been negotiated with each particular customer. Thus any suitable conventional algorithms may be employed by the host computer 10 for sourcing and pricing items of product type 03. The pricing algorithm employed for those items of product type 03 can also be the same algorithm employed for items of product type 01 which are regular Distributor products.

In step 310, host computer 10 creates a data block containing at least the net price per item, a code identifying the location of the inventory used in sourcing, and the quantity of the item available at that location. This data block is transmitted to local computer 40 in step 312.

As noted above, items of product type 04 are also sourced by the preferred embodiment of the system of the present invention. As to these items, the Distributor is providing the service of ordering the item(s) for the customer to simplify requisitioning and other administrative flow such as accounts payable management for the customer. The Distributor may not provide this service as to all third-party vendors, however, as will be discussed below.

If the product type of the line of the requisition being processed is 04, control passes through decision block 301 to decision block 316. In block 316, host computer 10 determines if the received vender number (VENDOR NBR) for the line of requisition data block being processed is a valid vendor from which Distributor will order items for shipment to the Customer. Host computer 10 performs this action by comparing the vendor number to a database containing all valid vendor numbers which is stored in host database 20. If the vendor number is not valid, host computer 10 creates a data block with an unauthorized vendor error code in step 318. This data block is transmitted to local computer 40 in step 312.

If the vendor number is determined to be valid in step 316, control passes to decision block 320. In block 320, host computer 10 determines if the received vendor catalog number (VENDOR CAT NBR) for the line of requisition data block being processed is a valid vendor catalog number which Distributor will order (from the relevant vendor) for shipment to the Customer. Host computer 10 performs this action by comparing the vendor catalog number to a database containing all valid vendor catalog numbers which is stored in host database 20. If the vendor catalog number is not valid, host computer creates a data block with an invalid product warning code (see code 500 in Table XXIV) in step 322. This data block is transmitted to local computer 40 in step 312.

The host computer 10 then prices the item in step 324 using any conventional algorithm or method. A data block is then created containing the price information in step 328, and this data block is transmitted to local computer 40 in step 312.

When local computer 40 receives a data block from host computer 10 in response to its previous transmission of a data block to the host, local computer 40 updates the Requisition Item Table for the relevant line (or lines) as shown in block 290 of FIG. 4C. As in the sourcing of items of product type 01, if an error code is received, local computer 40 displays Requisition Management data screen 68 with the relevant error code on monitor 41, as shown in step 294. At this point the CSR can evaluate the error for possible mistaken entry of the stock number, vendor code or vendor catalog number depending on the error code received; the CSR can then manually correct the error and resource the item. In the case of an invalid vendor error code, the CSR can contact the Distributor's central purchasing department for evaluation of adding a new vendor. If the CSR determines that the Distributor will not purchase from this vendor, he can change the product type to 05.

In the case where the vendor code is found in host database 20, but the vendor catalog number is not (i.e., where warning code 500 is received), the CSR may attempt to contact the Distributor so as to establish the product as a non-catalog special in host database 20 which can then be obtained as a type 04 product.

If, however, no error codes are received, local computer 40 displays Requisition Maintenance data screen 108 with the pricing data (and inventory data, for products of type 03) transmitted by host computer 10.

As noted above, items of product type 05 are not sourced using the preferred embodiment of the system of the present invention.

It will be noted that the above discussion of sourcing in FIGS. 4A through 4D has been in the context of requisition for a quantity of a single product (stock number). In the preferred embodiment of the present invention, requisitions having several lines, each of which is for a different item (having a different stock number) can be sourced at one time (i.e., by hitting the F6 key once). As will be clear to those of ordinary skill in the art, where more than one item is requisitioned in a single requisition, data block transmission and the printing of picking documents will preferably occur only after all items in the requisition have been processed. Thus, for example, if a requisition contains several items of product type 01, only one data block need be transmitted from local computer 40 to host computer 10, host computer 10 need transmit only one data block in reply to local computer 40, and only one picking document need be printed out. The data blocks will preferably contain the requisition line number of each requisitioned stock number, in addition to the data discussed above for each stock number.

The status codes which appear in the STATUS field of each line on Requisition Maintenance data screen 108 will now be discussed. The status of a line begins as "R" (Requisitioned) when the line item is first created on Requisition Management data screen 68. After sourcing, the status of a line becomes "S" (Sourced). After acceptance of a sourced requisition, the status can change to "F" (Filled), "B" (Backordered), "P" (In Process) or "C" (Canceled). If there is sufficient inventory at the relevant location (which depends on the product type of the requisitioned item) to supply the requisitioned line item, the line will have the status of Filled. If there is not sufficient inventory at the relevant location to supply the requisitioned line item, the line will have the status of Backordered. If the CSR determines that such a backorder is unacceptable to the requisitioner, he can source the item elsewhere: e.g., an item carried at the JIT as type 01 can be changed for this order to an 03 and ordered from warehouse 30 for direct shipment to the requisitioner. Similarly, the CSR can look for the inventory at other Distributor warehouses if it is not currently available at the JIT facility 51 or at warehouse 30.

A line having the status of In Process is one that has been sourced, but communications between the host computer 10 and local computer 40 were somehow interrupted while local computer 40 was awaiting a response from the host computer 10 during the acceptance process described below. Generally this will occur, when it does happen, for all of the line items in a single requisition. Lines having a status of In Process will eventually become either Filled or Backordered, as described below.

A line will have the status of Canceled if the CSR cancels the line item prior to acceptance, by hitting the F12 key from Requisition Maintenance data screen 108. Thus only a line having a status of Requisitioned or Sourced may be canceled.

Line items having the status of Filled or Backordered will have the status of Delivered ("D") when the items have been received and the receival is entered (as described below).

Local computer 40 updates the status of each line in Requisition Item table consistent with the manner described herein.

Orders having the header status (shown in the ORDER STATUS field of Order Header data screen 60) of Requisitioned or Sourced may be cancelled by hitting the F12 key from Order Header data screen 60. (An order has a header status of Requisitioned or Sourced if all of the line items in that order have the status of Requisitioned or Sourced.) A canceled order will have a "C" code in the ORDER STATUS field.

Prior to acceptance, the CSR can also decrease the quantity requisitioned QTY of any line on Requisition Maintenance data screen 108.

Acceptance

The CSR can accept all lines of the requisition if all lines have a status of Sourced by hitting the F2 key to ACCEPT. However, as discussed above, if the requisition includes items sourced from JIT facility 51 (i.e., items of product types 01 or 06), hitting the F2 key the first time causes local computer to print a picking document out as described in step 246 of FIG. 4A. This permits suitable personnel to pick the required items of product type 01 and 06 from the JIT facility 51. The quantities picked are then entered onto the picking document and compared by the CSR to the quantities shown. If the quantities agree, the CSR can hit the F2 key again to accept the requisition. If the quantities do not agree (e.g., due to breakage of one or more of the items in JIT facility 51), the CSR can go to the Inventory Adjustment data screen and adjust the inventory as described in detail below. If, on the other hand, there are no type 01 or type 06 lines on the particular requisition, then hitting the F2 key for the first time will accept the requisition.

In either event, accepting the requisition (by hitting the F2 key once or twice) causes control to be passed to the Purchase Order Build program 112 (shown in FIG. 2A). As described in the diagram FIGS. 5A and 5B, for items of product types 01, 03 and 04, local computer 40 uses Purchase Order Build Program 112 to create a purchase order between the Customer and the Distributor from the data in the Requisition Header and Item Tables.

For items of product type 06, a Purchase Order record internal to the Customer may be created at this stage, recording a sale from the Customer's purchasing department to the requisitioning department or account, for later use by the Customer's host computer in making accounting adjustments.

In the case of items sourced from JIT facility 51 (items of product type 01 or 06), the inventory records will be adjusted accordingly as described below.

Figure 5A:
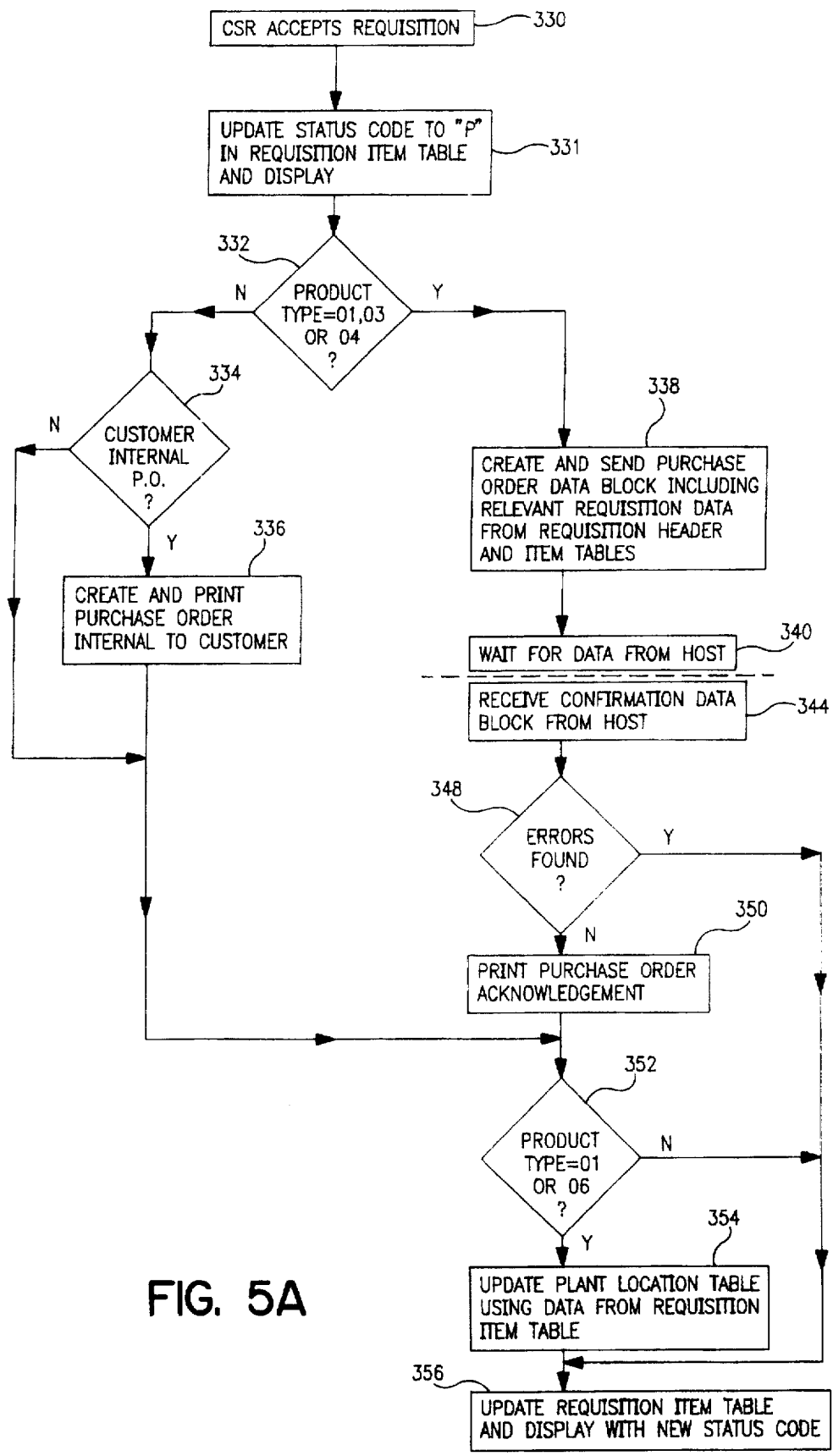
FIGS. 5A and 5B are flowcharts describing programs employed by an embodiment of the system of the present invention to accept a sourced requisition.

As shown in FIG. 5A, after the CSR accepts the requisition in step 330, local computer 40 updates the STATUS field of the Requisition Item Table for the relevant lines with the status code of "P" or In Process in step 331. This code will preferably remain visible on Requisition Maintenance data screen 108 for only a fraction of a second, before it is replaced with another status code as discussed below.

In step 332, local computer 40 then checks the product type of the requisition line item by accessing the product type (PT) field of the Requisition Item Table for that line. (As with the discussion of sourcing, FIGS. 5A and 5B describe the acceptance of a single line item for the sake of clarity.) In the preferred embodiment of the present invention, a typical requisition will often have several line items. In that event, the entire requisition is processed line by line by the respective computers before transmitting data to the other computer. Similarly, only one purchase order is generated for the requisition.

If the line item has a product type of 06, control is passed to block 334. As shown in steps 334 and 336, a Purchase Order record internal to the Customer may (at the option of the Customer) be created and printed out on printer 43 at this stage, recording a sale from the Customer's purchasing department to the requisitioning department or account. This internal purchase order can be used by the Customer's host computer in making accounting adjustments. Since the implementation of such an internal sale will vary depending on the Customer's own accounting software in a manner easily understood by one skilled in the art, these steps will not be further described here.

Regardless of whether or not such an internal purchase order is created for the Customer, control then passes through decision block 352 (as the product type is 06 in this case) to block 354. In block 354, the quantity on hand (QTY ON HAND) field of the Plant Location Table for the relevant part number (PART NUMBER) in local database 50 is reduced by the requisitioned quantity (QTY) for the relevant line in the Requisition Item Table (which is also in local database 50). At this point, control passes to block 356, where the local computer updates the status (STATUS) field of the relevant line of the Requisition Item Table to "F" for Filled. The display on Purchase Order Maintenance data screen 108 is also updated at this time.

If, on the other hand, the line item has a product type of 01, 03 or 04, control is passed from block 332 in FIG. 5A to block 338. In step 338, local computer 40 creates and transmits to host computer 10 a purchase order data block containing at least the customer account number (ACCT-NBR) and Requisition Number (REQ NBR) from the Requisition Header Table and 10 the line number (LINE), item stock number (STOCK NBR), quantity to be purchased (QTY), unit of measure (UM), product type (PT), net unit price (UNIT PRICE) and net total price (EXT PRICE) from the Requisition Item Table. If the product type is 01, the purchase order data block will also include an identification code for the JIT facility 51 (WHSE) and the quantity of the item available at that facility (QTY AVAIL). If the product type is 04, the purchase order data block will also include the vendor number (VENDOR NBR) and vendor catalog number (VENDOR CAT NBR) entered into the Requisition Item Table from Non-Catalog Information data screen 80. As noted above, the purchase order data block created in step 338 may have multiple lines with the associated data described above for each such line.

After the purchase order data block described in step 338 is transmitted to host computer 10 over the data link described above, local computer 40 waits for a response from the host, as shown in block 340.

The acceptance of a purchase order on host computer 10 is described in connection with FIG. 5B. In block 360, host computer 10 receives the purchase order data block transmitted from local computer 40. Receipt of a purchase order data block by host computer 10 causes the host to initiate host Purchase Order program 120 shown in FIG. 2B. In step 362 shown in FIG. 5B, host Purchase Order program 120 validates the data received in the purchase order data block. In the validation step, host computer 10 checks the customer account number, item stock number (using the product type information to determine what database in host databases 20 to search) and the price against the relevant information in host database 20 to validate the data in the received purchase order data block. If the item is of product type 01, host computer 10 also validates the identification code for the JIT facility 51 and the quantity of the item available at that facility (by comparing this data to the relevant entry in the table in host database 20 which indicates the quantity of each Distributor-owned item in JIT facility 51) in step 362.

If any of the validation checks performed in step 362 failed, control passes to block 364 where host computer 10 creates a data block with the appropriate error code or codes (e.g., invalid stock number or vendor). This data block is then transmitted to local computer 40 in step 374.

Figure 5B:
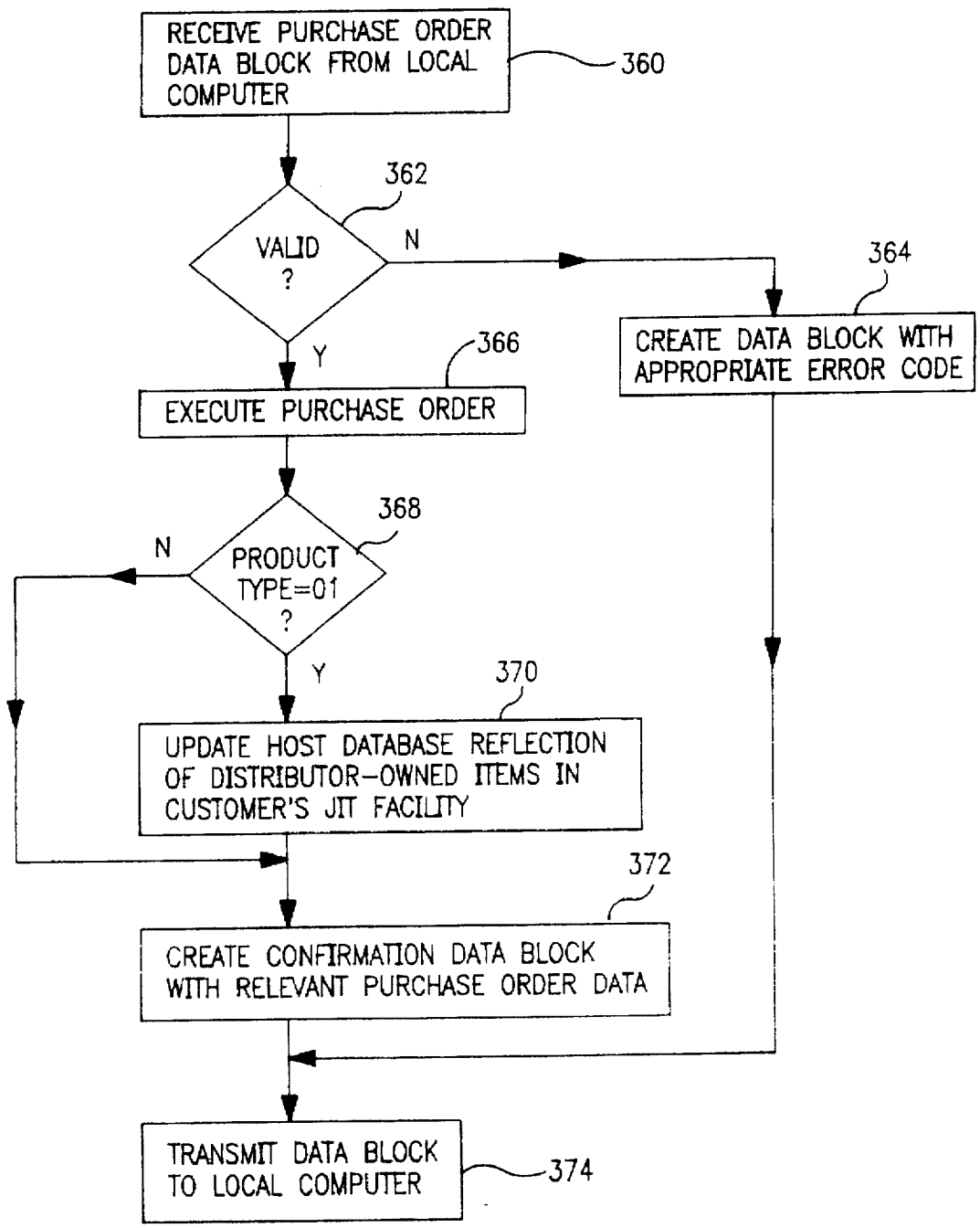

If none of the validation checks performed in step 362 fail, host computer 10 executes the purchase order as shown in step 366 of FIG. 5B using the Order Creation program 126 shown in FIG. 2B. Note that control passes through decision block 124 in FIG. 2B to the Order Creation program 126 because this is a new purchase order. Host computer 10 recognizes that local computer 40 is requesting that a purchase order be created because the purchase order data block received by the host computer 10 includes a code instructing the host computer 10 to process the data block as a purchase order, as opposed to as a confirmation inquiry.

As to items of product type 03 or 04, the execution of the purchase order by the host computer 10 in step 366 may be performed by any conventional means for arranging shipment of the item(s) from the Distributor Warehouse 30 or from the facility of a vendor (37 or 38), depending upon whether the type 03 or 04 product is routinely stocked by the Distributor. For type 03 and type 04 products, the host computer 10 will also cause an invoice to be created in step 366, billing the customer by EDI, in paper form or otherwise, but not necessarily involving the local computer 40 or the communications link provided to it. When the Customer's host computer receives that invoice (directly via EDI or indirectly otherwise), it can compare the invoice with the purchase order data that has, by then been uploaded from the local computer 40 (e.g., as a flat file).

If the product type is 04, host computer 10 verifies the vendor part number. If the part number is found, host computer 10 executes the order in step 366 by generating a proposed purchase order to the vendor and creates a data block including a status code of "B" (Backordered) for transmission to local computer 40. The Distributor's purchasing department will then verify that order (e.g., verifies that the pricing is correct) and generate a purchase order to that vendor. If, during verification, host computer 10 does not find the vendor part number, host computer 10 also creates a part record in the host database 20 when it creates the proposed purchase order to the vendor. The Distributor's purchasing department then verifies the information in the part record and issues the purchase order to the vendor as described above.

For items of product type 01 (local JIT inventory), the customer is billed for the items in step 366 as with any item ordered from the Distributor.

Host computer 10 next checks to determine whether the purchased item is of product type 01 in step 368. If the item is of product type 01, control passes to block 370, where host computer 10 updates the relevant entry (which is determined by the stock number of the purchased item) in the relevant table (which is determined by the location code for the JIT facility 51) in host database 20. Host computer 10 updates the relevant entry with a new quantity on hand, which is obtained by subtracting the quantity purchased from the old quantity on hand found which host computer 10 finds at that table entry.

Control then passes (either directly from block 368 or from block 370) to block 372, where host computer 10 creates a confirmation data block to transmit to local computer 40. As shown in FIG. 2B, confirmation is performed by the host Purchase Order Confirmation program 128 (control having passed from Order Creation program 126 through decision block 124). Host computer 10 adds information including the Distributor order number, line item status codes and any error or warning codes (see Table XXIV) to the confirmation data block. In step 374, the confirmation data block is transmitted to local computer 40.

In step 344, local computer 40 receives the confirmation data block from host computer 10. If any error codes are found in the received data block, control then passes through block 348 to block 356. In step 356, local computer 40 updates the Requisition Item Table and the display shown on Requisition Maintenance data screen 108 with (in this case) the information, including error codes, found in the received data block. Any line items generating error codes will have the status of canceled. The CSR will have to create a new requisition with corrected entries corresponding to the canceled lines to requisition these items.

If no error codes are found in the data block received from host computer 10, control passes through block 348 to block 350, in which local computer 40 directs printer 43 to print out a purchase order acknowledgment (unless no acknowledgment of the requisition was requested on Order Header data screen 60). The printed purchase order acknowledgement may employ any conventional form using data found in the Requisition Header and Item Tables.

In steps 352 and 354, local computer 40 updates the relevant data in local database 50 to reflect the removal of purchased products of product type 01 from JIT facility 51. This step is performed in the same manner as discussed above in connection with items of product type 06. The on hand quantity in the relevant Plant Location Table entry is reduced by the amount of the item purchased, as discussed above. For items of product type 01, step 354 insures that host database 20 and local database 50 will indicate the same on hand quantity of this item.

Control then passes to step 356, where (in this case) local computer 40 will update the STATUS field in the Requisition Item Table and the display shown on Requisition Maintenance data screen 108 to reflect receipt of the confirmation data block. The Distributor order number is also added to the Requisition Item Table and is displayed on Requisition Maintenance data screen 108 in the ORDER NBR field. If a line item (of product type 01 or 06) has any quantity on backorder, the status of that line will be a "B" for Backorder until the stock at JIT facility 51 is replenished. For line items of product type 01 or 06 where there is no backordered quantity, the status will now be "F" for Filled. For line items of product type 03 or 04, the status will now be "F" for Filled, "B" for Backordered or "C" for Canceled (e.g., if the product was discontinued) depending on the status code received in the data block.

If the communication link between local computer 40 and host computer 10 is interrupted shortly after the CSR accepts an order, the status of a line item may remain at "P" for In Process. If this is the case, the CSR may (after the communication link is reestablished), hit the F10 key while at Requisition Maintenance data screen 108. This causes a confirmation inquiry data block (containing the Purchase order number, Account number, line numbers, the date and time) to be created by local computer 40 using the Purchase Order Confirmation program 116 (shown in FIG. 2A) and transmitted to host computer 10. When host computer 10 receives this confirmation inquiry data block, it is passed by host Purchase Order program 120 (shown in FIG. 2B), through decision block 124 to Purchase Order Confirmation program 128. Most computer 10 recognizes this data block as a request for confirmation of a previously submitted requisition because of a code in the data block which instructs host computer 10 to process the data block using Purchase Order Confirmation program 128. Purchase Order Confirmation program 128 directs host computer 10 to send a confirmation data block to local computer 40 just as described above. The receipt of this confirmation block is as described above, and will alter the status code of the Requisition Item Table.

The function of the F11 key from Requisition Maintenance data screen 108 is very similar to that of the F10 key, except that the F11 key relates to purchase orders for items of product type 01 or 06 that have been filled through backorder allocation. By hitting the F11 key (where the status of the line is Backorderd), host computer 10 transmits a backorder inquiry data block including the Customer Account Number, Requisition Number, line numbers, date and time to host computer 10. As described above in connection with a confirmation inquiry, when host computer 10 receives the backorder inquiry data block, it checks host database 20 to determine whether or not the backordered order has been filled and sends a backorder confirmation data block to local computer 40 similar to that described above. The receipt of this confirmation block will update the status code of the Requisition Item Table from "B" to "F" if the status has changed.

As discussed above, Requisition Maintenance data screen 108 indicates, for each line, the quantity of an item that has been delivered or received (QTY REC) as well as the quantity of the item on Backorder (QTY BCKORD). When items are received from either the Distributor or a third-party supplier into the JIT facility 51, the CSR can use Requisition Maintenance data screen 108 to enter the receivals. By hitting the F5 key while the cursor is on the appropriate line, the CSR can change the value of the quantity received (QTY REC) to reflect shipments that have been received. Once all of the items in that line have been received, the status code will change to "D" for Delivered. Similarly, a backordered quantity (QTY BCKORD) will be reduced by the amount received once the various purchase or transfer orders for the items that were on backordered status are filled.

If all Backordered items for a line of a requisition of ORDER TYPE "T" (which is generated to restock Customer-owned JIT inventory 54, as discussed below) are received, the status of that line will automatically be changed to Delivered by local computer 40.

Hitting the F9 key from Requisition Maintenance data screen 108 allows the CSR to go to Print Driver data screen 118, a sample of which is shown in Table XV. Print Driver Screen 118 enables the CSR to print extra copies of order acknowledgments (F2), Bills Of Lading (F4), Picking Lists (F5) and Packing Lists (F6), to the extent that these documents are relevant to the requisition at issue.

As discussed above, the Requisition Header and Item Tables for a given requisition are stored in local database 50, where they remain after until they are deleted by the CSR. The data relating to a particular requisition can thus be subsequently retrieved for further review or updating. The data in the Requisition Header Table, Requisition Item Table and customer variable tables (associated with the customer variable data screens) may also be periodically uploaded to the Customer's host computer, e.g., as a flat file.

Inventory Maintenance

Inventory records for items in JIT facility 51 are created using the Part Master data screen, an exemplary screen being set forth in Table VI. To add an item to local inventory, the CSR enters an "A" (for Adding a record) in the ACTION CODE field, a Part Number, Product Type and Product Used indication. Fields are also provided for a Description, standard and alternate units of measure, list price, standard cost and current cost and information relevant to shipping the product (e.g., Hazardous Material code, Safety Data code, Bill Of Lading code, etc.). Distributor's current cost is what it would cost Distributor to purchase the item today. Distributor's standard cost is the cost upon which Distributor's gross margin is calculated and may differ (e.g., because of inventory on-hand that was purchased previously at a lower cost). This cost information, which is periodically downloaded from the host database 20, is for use by the CSR.

Other Action Codes the CSR may enter include "D" (Deleting a part record), "M" (Modifying a part record) and "I" (Inquiring, to permit the CSR to view information on the host database 20 without adding or changing the information in local database 50.)

If the item being entered is of product type 06 (Customer-owned JIT inventory), the CSR will also enter a code in the CUST OWNED PROD TYPE field to indicate how the item will be restocked. There will preferably be a different code for each of the possible manners of restocking the product, i.e., as a requisition of an item of product type 03, 04 or 05. The manufacturer part number can then be added in the adjacent field, if appropriate (i.e., if the underlying item is not purchased from the Distributor). If the item has product type 03 for restocking purposes, the CSR can enter a code to identify the Distributor warehouse that will normally used to replenish the JIT inventory in the T/O SOURCE WHSE field.

If the Distributor normally has the an item of product type 04 direct shipped to its Customers from a vendor 37, that can be so indicated in the STOCK POLICY FIELD. Other possible entries in that field include codes to indicate, if the item is of product type 03, which of the Distributor warehouses should be searched in sourcing the item. One such code might indicate that the item should be shipped from only a particular warehouse, and backordered if it is not found at that location. Another such code might indicate that the item should be shipped from only one of two particular warehouses, and backordered if it is not found at either of those locations. If no code is entered, the general sourcing rules of the Distributor (which may employ searching several warehouses in a predetermined order) will be used. The specific algorithms employed in connection with these STOCK POLICY codes are well known to those of ordinary skill in the art and thus are not described in detail here.

The ABC CLASS field, on the other hand, which includes information downloaded from host database 20 when the Part Master record is added to local database 50, indicates the Distributor's stocking policy for the item. Thus different codes in this field may indicate that the item is stocked in all Distributor warehouses, some Distributor warehouses, or few or no Distributor warehouses. This information is intended to aid the CSR in assessing alternatives for obtaining backordered items.

To enter any changes into the Part Master Table on local database 50, the CSR must first hit the Enter key, so that local computer can validate the entered information by determining if sufficient information has been entered. (That is, if the CSR has entered at least a valid ACTION CODE, a PART NBR, a PROD TYPE and a USED IND.) If the CSR has entered the required information, local computer 40 displays a message prompting the CSR to confirm the update by hitting the F11 key. The action that follows the CSR's hitting the F11 key (Confirm Update) depend on the information the CSR has entered. If the product type of the item is 01, it may be restocked from Distributor's regular catalog items. Thus when the CSR hits the F11 key local computer creates a data block including the Account Number, location code, action code, part number and product type indication for transmission to host computer 10. The host computer 10 compares the received part number to its master database of Distributor catalog items, and if it finds a match, creates a data block using the data in the master database (which is in host database 20) to send back to local computer 40.

The data block transmitted by host computer 10 to local computer 40 includes data to fill in many of the fields shown on the Part Master data screen which the CSR has not himself filled in, such as the DESCRIPTION, price data, STD UNIT, ABC CLASS etc. Local computer 40 then uses the information in the received data block to add a new entry in the Part Master Table stored on local database 50 for the item.

If the item being updated on the Part Master data screen is of product type 06, the confirmation of the update depends on how the product is to be restocked (which corresponds to the indicator in the CUST OWNED PROD TYPE field). If the item is to be restocked as an item of product type 03, the confirmation of the update proceeds essentially as described above for items of product type 01, except that host computer 10 does not create a new entry in a part master table for the relevant JIT facility 51 in host database 20 (as host computer 10 will only be tracking Distributor-owned inventory 52 in JIT facility 51.)

If the item being updated on the Part Master data screen is of product type 06, and the item is to be restocked as an item of product type 04 or 05, there is no data block transmitted to host computer 10. Rather, local computer 40 simply adds an entry to the Part Master Table in local database 50 for the item. The CSR must, however, have added a manufacturer part number, else an error message will be generated.

After entering the information in the Part Master Data screen, the CSR can hit the F5 (PLANT) key to go to the Plant Location data screen, a sample of which is set forth in Table VII. This data screen provides access to the Plant Location Table in local database 50. In creating a new entry in the Plant Location Table, the CSR enters the MAX ORDER QTY, MIN ORDER QTY and the REORDER POINT, which are described in Table 2:

TABLE 2

| FIELD NAME | DESCRIPTION |
| --- | --- |
| MAX ORDER QTY | Maximum quantity to be ordered in replenishment |
| MIN ORDER QTY | Minimum quantity to be ordered in replenishment |
| BACK ORDER QTY | Quantity of item presently on backorder |
| REORDER POINT | When the quantity on hand less any allocated quantity falls below the reorder point, the system will recommend a restocking order during replenishment. |
| QTY ON HAND | Quantity in local warehouse |
| QTY ON ORDER | Quantity on order |

TABLE 2-continued

| FIELD NAME | DESCRIPTION |
| --- | --- |
| ALLOCATED QTY | The allocated quantity is the quantity reserved in the local database for a particular requisitioner. The quantity on hand less any allocated quantity is the quantity available to other requisitioners. |

The remaining data in Table 2 (BACK ORDER QTY, QTY ON HAND, QTY ON ORDER and ALLOCATED QTY) will be tracked and updated by local computer 40 as described herein.

If the product type is 01, after initial validation by local computer 40 when the CSR hits the Enter key, hitting the F11 key from the Plant Location data screen causes local computer 40 to create a data block using the part number, location identification code and information entered on the Plant Location data screen. This data block is then transmitted to host computer 10, which confirms the data and creates a new entry in its plant location table for the relevant JIT facility location with the transmitted data. Host computer 10 then transmits a confirmation data block to local computer 40 (if there were no errors), which adds an entry to the Plant Location Table in local database 50 using the information displayed on the Plant Location data screen.

If the product type is 06, no data block is created and transmitted to host computer 10. Rather, local computer 40 just adds an entry to the Plant Location Table in local database 50 using the information displayed on the Plant Location data screen.

Using the Part Master and Plant Location data screens, the CSR builds item records for all items in local inventory, whether of product type 01 or 06. The Customer Account Maintenance data screen (set forth in Table XIII) is also used by the CSR to provide local database 50 with customer account data which is utilized in the order header of a requisition. For items of product type 01, the data on local database 50 are also sent to host computer 10, where a data file reflecting the contents of JIT inventory (product type 01) is created.

From time to time, the CSR may need to adjust the value of the quantity on hand of a particular item in JIT facility 51. This can done using the Inventory Adjustment data screen, a sample of which is set forth in Table VIII. Using the Inventory Adjustment data screen, the CSR may adjust the quantity of an item of product type 01 or 06 up or down by entering PART NUMBER, PLANT CODE (which identifies the JIT facility), TOTAL BIN QTY (the quantity in the relevant bin in JIT facility 51) and the amount of the adjustment in the PLUS or MINUS fields under the ADJUSTMENT QTY heading. The CSR must also enter a REASON CODE indicating the reason for the adjustment in the appropriate field. Exemplary reason codes are set forth in Table 3:

TABLE 3

| Reason Code | Description |
| --- | --- |
| 01 | Product Writedown — New Part To Used Part |
| 02 | Product Writedown — Soon To Expire Product |

TABLE 3-continued

| Reason Code | Description |
| --- | --- |
| 10 | Expired Material |
| 20 | Warehouse Breakage — Customer Shipment |
| 21 | Warehouse Breakage — Claims |
| 22 | Warehouse Breakage — Vendor Refurbishing |
| 23 | Warehouse Breakage — ISD Refurbishing |
| 24 | Warehouse Breakage — Sundry |
| 25 | Loss And Damage — Warehouse Breakage |
| 52 | RIMS Stock Return To Host Warehouse |
| 90 | Physical Inventory Adjustment |
| 91 | Transfer Order Misshipments |
| 92 | Scrap Of Dead Or Excess Inventory |

Once the CSR has entered the required information and hit the Enter (Return) key, local computer 40 validates the entered PART NUMBER and TOTAL BIN QTY by using the PLANT CODE to reference the relevant entries in the Part Master and Plant Location Tables in local database 50. Local computer 40 also checks to see if a negative ADJUSTMENT QTY exceeds the quantity on hand (which should be the same as the TOTAL BIN QTY). If validation fails, local computer 40 prompts the CSR with an appropriate error message, and the CSR may again try to make the adjustment. For example, in the screen shown in Table VIII, the error message "Part Master Record Not Found" is displayed one line from the bottom of the data screen.

If there are no errors in validation, local computer 40 prompts the CSR to update the JIT inventory records (which will be done by altering the QTY ON HAND for the relevant entry in Plant Location Table local database 50) by hitting Enter. When the CSR hits enter, local computer 40 executes the program shown in FIG. 6A. After the CSR hits Enter (which is shown in step 380) local computer 40 checks the product type of the item (which is in the Part Master Table) to determine whether it is 01 or 06, as shown in step 381. If the product type of the item is 06, local computer proceeds to step 392 where the QTY ON HAND in the Plant Location Table for the adjusted item is modified to add or subtract the Adjustment Quantity as appropriate (depending upon whether the CSR entered the Adjustment Quantity in the PLUS or MINUS field.

If, however, the product type of the item is 01, control passes to block 382, where the local computer creates a data block including the JIT location code (PLANT JIT SITE in the Plant Location Table), the PART NUMBER, the TOTAL BIN QTY, the Unit of Measure and the ADJUSTMENT QTY (all entered onto the Inventory Adjustment data screen). The REASON CODE may also be added to this data block if this information is desired by the Distributor. This data block is transmitted to host computer 10 in step 384. Local computer 40 then waits for a response, as shown in block 385.

Figure 6A:
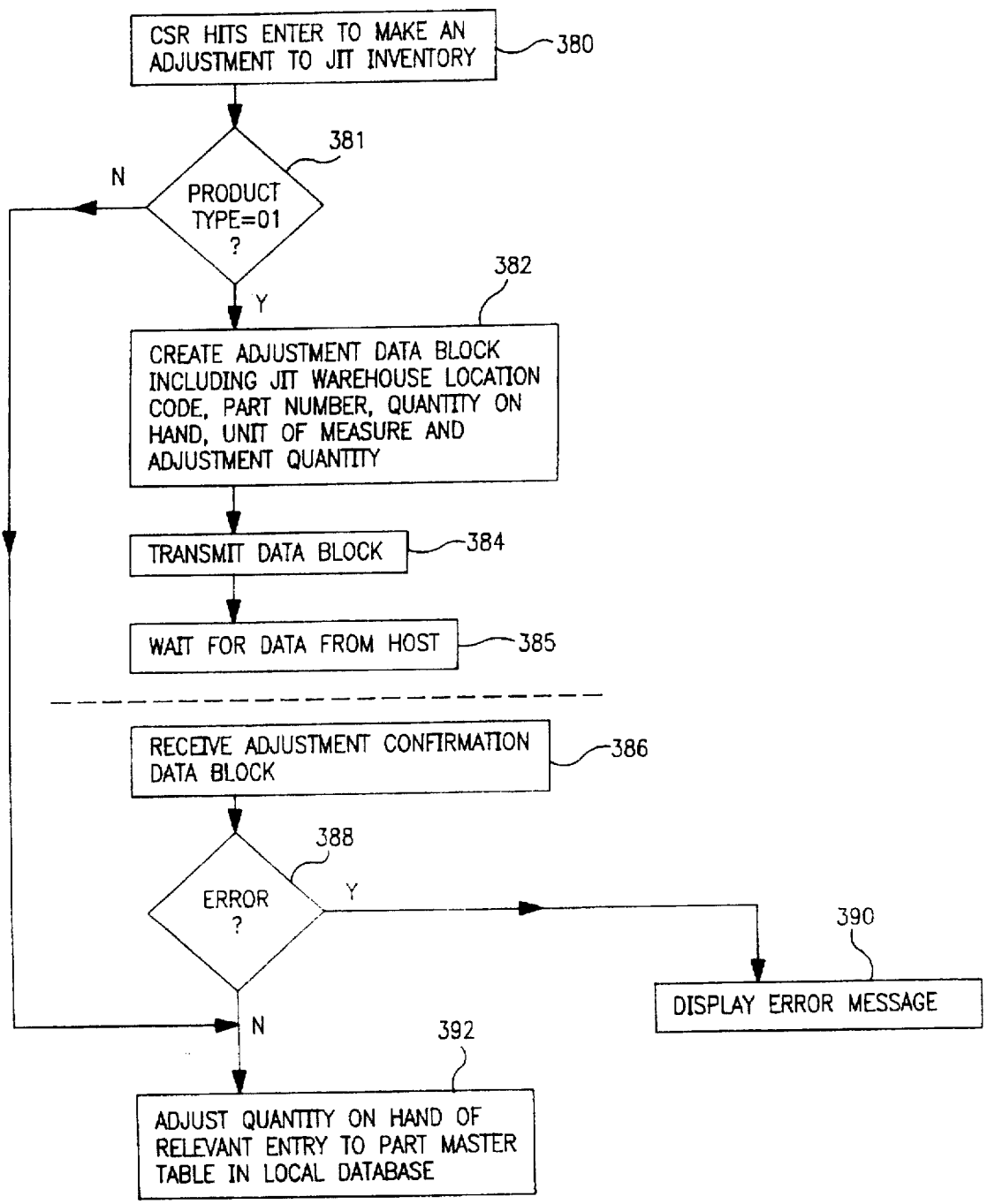
FIGS. 6A and 6B are flowcharts describing programs employed by an embodiment of the system of the present invention to adjust the quantity on hand of an item in JIT inventory.
Figure 6B:
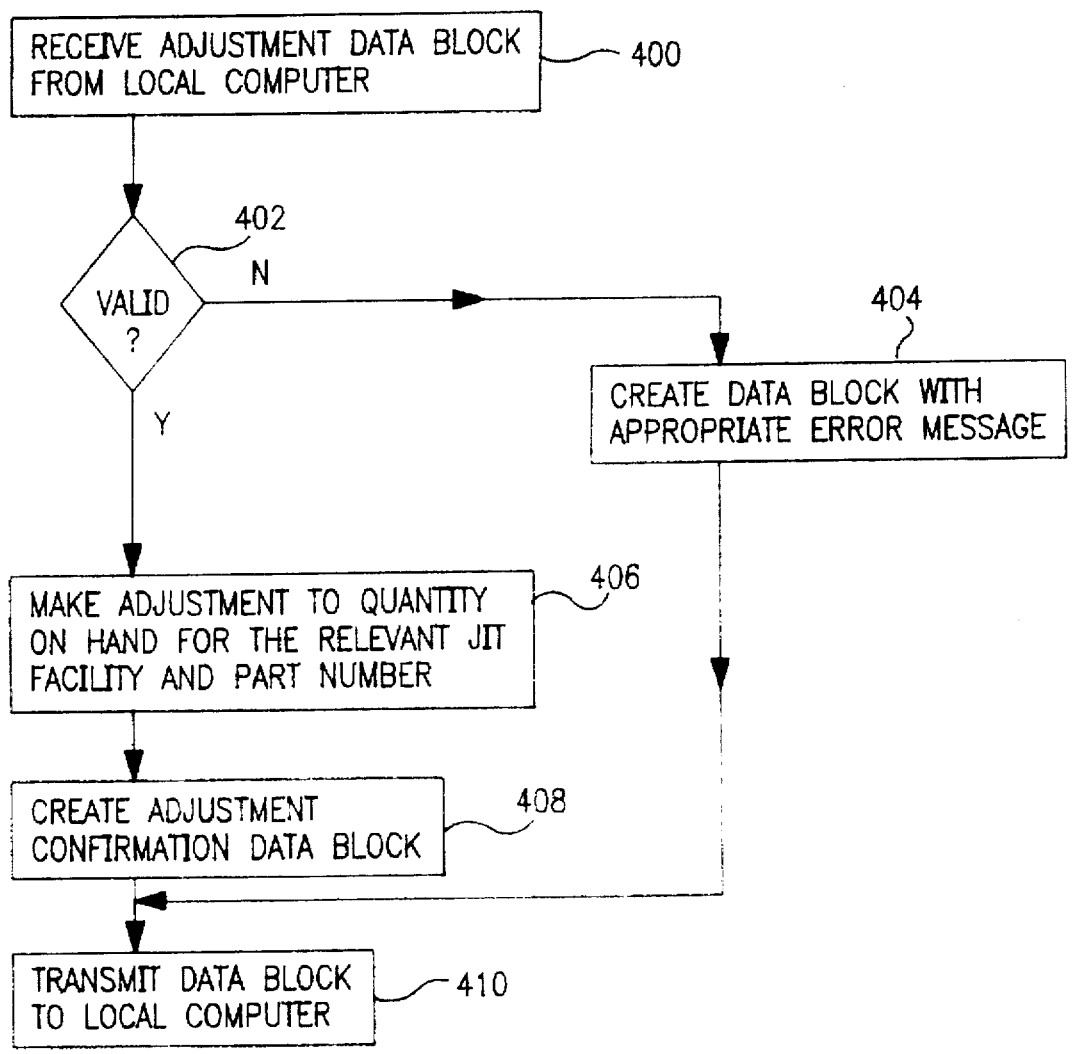

The processing of the JIT inventory adjustment by host computer 10 is shown in FIG. 6B. In step 400, host computer 10 receives the adjustment data block from local computer 40. In step 402, host computer validates the data received in step 400. In this step, host computer 10 checks host database 20 to determine if the PART NUMBER and PLANT CODE are valid (i.e., if host database 20 includes corresponding records.) Host computer 10 then changes its entry for the quantity on hand in the corresponding reflection records stored in host database 20 for the relevant JIT facility to match the received TOTAL BIN QTY. Host computer 10 also validates the REASON CODE, if this code was received in the transmitted data block. The validation of the REASON CODE may employ any conventional algorithm. If any of the validation checks fails, an error data block is created with an appropriate error message, as shown in step 404. This data block is then transmitted to local computer 40, as shown in step 410.

If no error is detected in validation step 402, control passes to step 406. In step 406, host computer 10 adjusts the entry for the quantity on hand in the corresponding JIT inventory reflection records stored in host database 20 for the relevant JIT facility. An adjustment confirmation data block is then prepared in step 408. This data block includes an indication of the result of the adjustment, or an error code if the adjustment was not made. This data block is transmitted to local computer 40 in step 410.

Local computer 40 receives the data block transmitted by host computer 10 in step 386, shown in FIG. 6A. In step 388, local computer 40 checks to see if there are any error codes in the received data block. If an error code is detected, control passes to block 390, where the appropriate error message is displayed on the Inventory Adjustment data screen. If, on the other hand, no errors are detected, control passes from block 388 to block 392, where local computer 40 adjusts the quantity on hand of the relevant entry of the Plant Location Table in local database 50.

Periodically, requisitioned goods distributed from JIT facility 51 may have to be returned to JIT facility 51. The CSR can return goods to the JIT facility 51 by proceeding to Order Header data screen 60 and entering an Account Number and a Requisition Number. The CSR must then enter a "G" into the ORDER TYPE field on Order Header data screen 60 so that order type field of the Requisition Header Table for this transaction will be recognized by local computer 40 as a returned goods transaction.

As with an ordinary requisition, the CSR may then enter customer variable data using Customer Variable Header data screen 64. By hitting the F2 key from Order Header data screen 60, local computer 40 will then display the Return Goods data screen, an example of which is set forth in Table XIV. This data screen is very similar to Requisition Management data screen 68, and the CSR enters data onto the Return Goods data screen this screen as described in connection with the use of Requisition Management data screen 68. The CSR must enter a valid STOCK NBR, a RET QTY (return quantity), a UM (unit of measure) and a PT (product type). Once the CSR has entered the required information, if the CSR hits the Enter key, local computer 40 will validate the entered data (much as local computer 40 validated the data entered onto the Inventory Adjustment data screen). If no errors are detected, local computer 40 runs a program which is essentially the same as that described in FIG. 6A in connection with adjustments to inventory. As in FIG. 6A, if the returned item (for the line being processed) is of product type 06, local computer 40 immediately adjusts the relevant quantity on hand entry in the Part Master Table in local database 50 (this time by adding the quantity in the RET QTY field to the prior quantity on hand).

If the item or items being returned are of product type 01, local computer builds a data block to transmit the appropriate data to host computer 10, just as is shown in FIG. 6A.

The host's processing of the return of goods is essentially the same as that shown in FIG. 6B in connection with adjustment of JIT inventory. The host validates the information received and creates an error block as described in connection with FIG. 6B if necessary. Otherwise, host computer 10 accesses the quantity on hand field for the relevant part number and JIT facility in host database 20 and adds the returned quantity to this amount to get a new quantity on hand. Host computer 10 then transmits a confirmation data block to local computer 40. Upon receiving this confirmation data block, local computer 40 then (assuming no error code is received) similarly updates the relevant quantity on hand entry in the Part Master Table in local database 50 (by adding the quantity in the RET QTY field to the prior quantity on hand), just as is shown in FIG. 6A.

Inventory Replenishment

Replenishment of local inventory is initiated when the CSR enters the code REPL into the RESPONSE field on any data screen. A replenishment algorithm (which may be one of many which are well known to those of ordinary skill in the art) is then executed using the data from the fields described in Table 2.

An exemplary replenishment algorithm may employ two steps, as follows. First, a determination is made as to whether or not to restock the inventory for each item having a Plant Location Table entry. If the quantity available (the quantity on hand (QTY ON HAND)) is less than or equal to the REORDER POINT, then the inventory for the item will be restocked.

Local computer 40 then creates a Replenishment Results Table in the random access memory of local computer 40. There will be one transfer order entry in the Replenishment Results Table for each part to be restocked. Each transfer order entry contains the following information: the relevant part number, product type, the plant location, the restocking source location, maximum order quantity, minimum order quantity, back order quantity, reorder point, quantity on hand and quantity on order from the relevant tables in local database 50.

Next, local computer 40 runs the second step of the replenishment process to determine the quantity to be ordered to restock each item being restocked. For each transfer order entry in the Replenishment Results Table, local computer 40 performs an algorithm such as the following using data in the relevant fields of the Plant Location Table:

Proposed Order Qnty.=((MAX ORDER QTY−QTY ON HAND)+ (BACK ORDER QTY−QTY ON ORDER))

Local computer 40 then enters the calculated Proposed Order Quantity into a Quantity field in each transfer order entry in the Replenishment Results Table. When this has been done for all of the transfer order entries, local computer 40 then sorts the entries in the Replenishment Results Table by product type (01 or 06). Some of the entries having product type 01 are preferably further sorted by a SOURCE LOCATION code in the Plant Location Table (see the exemplary Plant Location data screen, which is used to create the Plant Location Table). The SOURCE LOCATION code identifies the particular Distributor warehouse that item is sourced from; by grouping such items together in the Replenishment Results Table, individual transfer orders generated from replenishment will thus be more likely to be sourced by a single warehouse, which will simplify tracking of the transfer (and requisition) orders as items are received.

When sorting is complete, local computer 40 creates transfer orders from the sorted Replenishment Results Table. In the preferred embodiment of the present invention, each transfer order will have at most fifteen line items (each of which is directed to a particular quantity of a selected item). Local computer 40 uses this limitation and the product type classification discussed above to break the entries (starting with the first 15, if they are all of the same product type) of the Replenishment Results Table into individual transfer orders. Any conventional algorithm may be employed to fulfill this function.

Local computer 40 assigns each transfer order a unique identifying Replenishment Number. For each transfer order, local computer 40 creates and stores a Transfer Order Header Table in local database 50 using the Replenishment Number in local database 50. Local computer 40 then uses the data in the Replenishment Results Table to create and store in local database 50 a Transfer Order Item Table using the procedure described above. The Transfer Order Item Table includes the same information for each item in the Replenishment Results Table that was in the latter table with the addition of the Replenishment Number. Local computer 40 then displays a message on the message line of the currently active data screen to indicate that the replenishment program has been completed.

The CSR may then go to the Transfer Order List data screen (an exemplary Transfer Order List data screen is set forth in Table XIX) by entering the code TOLP into the RESPONSE field of any data screen to review the transfer orders generated as a result of replenishment. As shown in the exemplary Transfer Order List data screen in Table XIX, the transfer orders are preferably displayed in a chronological order with the most recently generated transfer order displayed first. Thus if the CSR goes immediately to the transfer order data screen after replenishment is complete, the first transfer orders listed will be those generated from replenishment (unless no transfer orders were generated in replenishment).

For each transfer order, the Transfer Order List data screen preferably displays its associated Replenishment Number, a status code and the creation date of the transfer order, as shown in Table XIX. The status code may have the following values: "W" for Working transfer order; "O" for Open transfer order; "R" for Received into receiving and "C" for Closed. A transfer order has the status of Working until it is accepted by host computer 10, after which it has the status of Open, and a Transfer Order Number assigned by host computer 10 is added. If the items requested in a transfer order have been received at the receiving area of JIT facility 51, but have not yet been put into stock, that order will have the status of Received. Once the items are put into stock in JIT facility 51, the transfer order will have the status of Closed.

Six options are shown on the Transfer Order List data screen which the CSR may exercise by entering the appropriate number. The first option, Replenishment Order Deletion, permits the CSR to delete the replenishment order, provided that it has the status of Working.

Selecting the second option, Transfer Order Maintenance, causes local computer 40 to display a Transfer Order Maintenance data screen. (An exemplary Transfer Order Maintenance data screen is set forth in Table IX.) This data screen resembles the Requisition Maintenance data screen 108 in both appearance and function to some degree, although it applies to transfer orders. Thus the Transfer Order Maintenance data screen includes the following fields for each line item (which are derived from the corresponding Transfer Order Item Table entry): a line number (T/O LINE), PART NUMBER, unit of measure (UOM) which indicates the standard units to be transferred, conversion factor (CONVERT FACTOR) which indicates the number of standard units per unit used, ORDER QTY, BCKORD QTY and CANCEL QTY. At this time (prior to acceptance) all of the fields except for the BCKORD QTY and the CANCEL QTY will be filled in.

The ORDER QTY field will display the Proposed Order Quantity calculated by local computer 40 as discussed above. The CSR may use this proposed quantity or change the value in the ORDER QTY field as desired. This permits the CSR to tailor restocking orders using knowledge which then may be available to him (e.g., that the Customer will soon be needing a very large supply of an item which is not normally stocked in large volume in JIT facility 51.)

The CSR may also add items to the displayed transfer order using the F10 (Add Items) key, which will allow the CSR to add the relevant information for an additional item on a new line number. The CSR may also create a new transfer order (e.g., if the current transfer order already has 15 line items) from Transfer Order Maintenance data screen by hitting the F9 (New T/O) key.

The CSR can then accept the transfer order displayed on the Transfer Order Maintenance data screen by hitting the F5 (Accept T/O) key. The events caused by acceptance of a transfer order differ depending on the product type of the items in that transfer order. A single transfer order will preferably contain only items of product type 01, or only items of product type 06. Thus a transfer order will preferably not include both items of product type 01 and 06.

If the transfer order is of product type 06, the system of the present invention treats it as a type of requisition. Upon accepting a transfer order of product type 06, local computer 40 will display Order Header data screen 60 to permit the CSR to enter an Account Number and a Requisition Number. (The ORDER TYPE field will now display a "T" to indicate that the requisition was generated to replenish Customer-owned JIT inventory 54.) The CSR may then hit the F6 key to source the requisition. The transaction then proceeds as described above, with all subsequent maintenance of the order being performed from Requisition Maintenance data screen 108, as described above. The processing of transactions replenishing Customer-owned JIT inventory 54 is processed as a requisition because, as with a requisition, the Customer must purchase these items from the Distributor or from another supplier so that they will be owned by the Customer.

If a transfer order comprises items of product type 01, however, these items are used to restock the Distributor-owned inventory 52 in JIT facility 51. Thus these items will not be purchased by the Customer at this time, but merely transferred to JIT facility 51. Aside from this difference, the processing of transfer order for items of product type 01 is similar to the processing of a requisition, but there is no pricing or invoice generation. Additionally, because all transfer orders are for products of product type 01, the processing of a transfer order includes the updating of the records on host database 20 regarding Distributor-owned inventory in JIT facility 51 whenever the corresponding records in local database 50 are updated.

When the CSR accepts a transfer order of product type 01, local computer 40 uses the data in the Transfer Order Header and Transfer Order Item tables to build a data block to be sent to host computer 10. This data block includes the location code, source location code, the date and time, and for each line number, the part number and quantity to be transferred. This data block is then transmitted to host computer 10.

Upon receiving the transmitted data block, host computer 10 validates the data in the same manner as with a requisition and builds a transfer order in host database 20 indicating the quantity of items ordered, the quantity to be put on backorder, and the quantity to be cancelled. (The cancelled quantity refers to ordered items which the Distributor will not be shipping, e.g., discontinued items.) As with a requisition of an item of product type 03, a picking list will later be generated in Distributor warehouse 30 or the relevant Distributor warehouse for the items that host database 20 indicates are on hand so that the items can be shipped to JIT facility 51.

Host computer 10 then assigns a Transfer Order Number to the order and builds and transmits a confirmation data block (or an error block if an error was detected in the validation step) to local computer 40. Local computer 40 uses this received data block (which includes the Transfer Order Number) to update its Transfer Order Item Table and the display on the Transfer Order Maintenance data screen. This data block includes a status code and any backordered or cancelled quantities of the item. The status of the line will then be Shipped ("S") if the ordered quantity of the item was found in the a Distributor warehouse or Backordered if all of the ordered quantity of the item was not found in the a Distributor warehouse (with the backordered quantity being displayed).

Returning to the Transfer Order List data screen in Table XIX, the CSR has four remaining options in managing transfer orders, in addition to the two that were previously discussed. One of these options is number 4, Single Line Receival. If the CSR hits "4" from this data screen, local computer 40 will display the T/O Receivals data screen, an example of which is set forth in Table XVI. This data screen permits the CSR to update local database 40 to reflect the receipt of a shipment including an ordered line item of product type 01 at JIT facility 51.

The CSR enters the appropriate quantities into the QTY RECEIVED and QTY DAMAGED fields onto T/O Receivals data screen to reflect the state of the received shipment. The CSR can also decide whether to receive the shipment into stock (i.e., into the appropriate bins in JIT facility 51) or into receiving (to reflect that the items have arrived at JIT facility 51 before they are received into stock) by entering an "X" into the appropriate field on the T/O Receivals data screen. When the CSR has entered this information (using the Enter key) and local computer 40 has validated it, the CSR can hit the F10 (Receive T/O) key. This directs local computer 40 to build a data block containing the Transfer Order Number, the line number of that transfer order, the Receipt Number (which is taken from the receipt sent with the shipment and entered into the RECV field), the quantity received and any other information entered by the CSR into the T/O Receivals data screen, and transmit it to host computer 10. Host computer 10 then validates the received information and updates its inventory records for the particular JIT facility and Part Number. Host computer 10 then sends a confirmation data block to local computer 40, which then updates the quantity on hand field of the relevant entry in the Plant Location Table (if the item has been received into stock) and the relevant fields in the Transfer Order Item Table. Once all of the items in a transfer order are received, the status of that transfer order will automatically be changed to Closed.

By hitting the F5 key from the T/O Receivals data screen (or by selecting the fifth option from the Transfer Order List data screen), the CSR can direct local computer 40 to display the Modify Receipt Process data screen. (A sample Modify Receipt Process data screen is set forth in Table XX.) This data screen enables the CSR to change the status of some or all of items received into receiving status to be received into stock status (and vice versa). If the CSR has arrived at this data screen from the T/O Receival data screen, the Modify Receipt Process data screen will already display at least the Transfer Order Number (ORD NBR), Receipt Number (RECV), line number (LINE), Part Number (PART NBR), QUANTITY STOCKED, QUANTITY IN RECEIVING and associated information. Otherwise, the CSR can call up this information by entering the relevant Transfer Order Number, Line Number and Receipt Number into the Modify Receipt Process data screen and hitting Enter, which will call up the associated data (such as the QUANTITY STOCKED).

The CSR can then transfer items from stock to receiving, or vice versa, by entering quantity to be transferred into the quantity field and entering an "S" or a "R" to identify the direction of the transfer. When this data has been entered, local computer 40 validates the entered data to determine if the transfer is possible (i.e., if there is a sufficient quantity of the item in the location from which the quantity is being transferred).

After this validation, the CSR may confirm the update by hitting the F10 key, which will cause local computer 40 to create and transmit an appropriate data block to host computer 10, and host computer 10 will repeat the updating and confirmation transmittal process discussed above in connection with the T/O Receivals data screen. When local computer 40 has received confirmation, it will update the status of the relevant fields of the Transfer Order Item Table and the Plant Location Table as needed.

Another option that may be selected from the Transfer Order List data screen is the Multiple Line Stock Receival data screen. (A sample Multiple Line Stock Receival data screen is set forth in Table XXI.) This data screen performs the same function as the T/O Receival data screen, except that multiple lines of a transfer order may be received. In the exemplary data screen shown in Table XXI, the CSR cannot receive items into receiving from the Multiple Line Receival data screen. The Multiple Line Receival data screen could easily by modified to permit reception into receiving by adding fields shown in the T/O Receival data screen.

The final option available from the Transfer Order List data screen is Transfer Order Close. This option is not normally needed as transfer orders are usually closed automatically when all of the items requested therein are received. This data screen is available to permit the CSR to open or close a transfer order in unusual circumstance. For example, a shipment might be received in response to a transfer order, and the order closed. But it may later be realized that the received items were a misshipment, and were not the ordered items. The CSR could then use this data screen to reopen the transfer order. As with the other data screens affecting the status of transfer orders, local computer 40 must first inform host computer 10 that it wishes to close or reopen a transfer order and wait for confirmation before the relevant records in local database 50 are updated.

Cross-Referencing

As described above, the preferred embodiment of the present invention may identify items to be requisitioned using several different part numbering systems. In addition to the Distributor's own catalog numbers, the vendors from which the Distributor will stock or order items may also have their own vendor part numbers. Moreover, the Customer may employ its own catalog of part numbers using a numbering system unique to that Customer. The Distributor, other distributors and the Customer will frequently use different identifying part numbers for items which are essentially equivalent, e.g., a 250 ml PYREX Griffin beaker, manufactured by Corning (who designates it as part number 1000 250) could have a Distributor's catalog number 02 540K and competitor's part numbers B2650250, 13912207, and 029827. Distributor and competitors may also have similar products from other vendors (e.g., a 250 ml KIMAX Griffin beaker from Kimble).

To address this situation, the preferred embodiment of the system of the present invention includes a Host Cross-Reference Table in host database 20 as well as a Local Cross-Reference Table in local database 50.

The Host Cross-Reference Table includes, for each item regularly stocked or supplied by the Distributor (i.e., items of product type 01 or 03) a list of the corresponding part numbers of Distributor's vendor and other distributors (which are identified by a competitor number) for items which have been determined to be equivalent. This relational database is created by the Distributor by, for example, reviewing the catalogs of other distributors and determining which items are equivalent to items in the Distributor catalog.

Additionally, as discussed above, host database 20 also includes a database of valid vendor codes and vendor part numbers for items which are not regularly supplied by the Distributor, but which the Distributor will order for shipment to the Customer (i.e., items of product type 04).

The CSR at local computer 40 creates the Local Cross-Reference Table in local database 50 using the Cross Reference Maintenance data screen 76 (shown in FIG. 2A), a sample of which is set forth in Table XVIII. The Cross Reference Maintenance data screen 76 can be reached by hitting the F5 (XREF MAINT) key from the Cross Reference Number List data screen 72, a sample of which is shown in Table XVII. The latter data screen permits the CSR to view portions of a list of cross reference numbers stored in the Local Cross Reference Table, as will be clear to one of ordinary skill in the art from Table XVII.

The CSR can then enter the Customer's part number in the CROSS REF NUMBER field, and the corresponding Distributor's catalog number in the CATALOG NUMBER field. Alternatively, the CSR may enter a catalog number of the vendor or another distributor in the CATALOG NUMBER field, and a corresponding vendor or competitor number in the VENDOR NUMBER field. The CSR must also enter a product type in the PROD TYPE field. Finally, the CSR must enter a unit of measure in the VEND UM field if the CATALOG NUMBER is that of a competitor.

Once the CSR has entered this information, he can hit the F6 (Add) key to add the entered data to the Local Cross Reference Table. Local computer 40 then creates a data block including the Customer's cross reference number, the associated catalog number (and a vendor number, if appropriate) and the product type. This data block is then transmitted to host computer 10 for validation.

If the product type is 01 or 03, host computer 10 validates the data in the received data block by accessing the Distributor product data on host database 20. If host computer 10 does not find the item in the Distributor product data, it then searches one or more Most Cross Reference Tables for the item. This process is similar whether it occurs in response to a data block received from the local computer 40 when operating under the cross-referencing program (as described here) or in response to a data block received from the local computer 40 during the sourcing process described earlier (see block 302 of FIG. 4D and the related discussion of verifying a line of a requisition containing an 03 code). That use during sourcing will be described first, with the above PYREX Griffin beaker used as an example.

If, during sourcing, the host is validating a catalog number for a purportedly 03 item, it will search a series of files in host database 20. One such file may be unique to the Customer, containing the Customer's stock numbers cross-referenced to a Distributor catalog system. In the present system, the ordered item is likely not to be found in that file because (as described below) the local computer 40 will normally convert Customer stock numbers to Distributor catalog numbers using the Local Cross Reference Table before the data block is sent (see block 282 in FIG. 4C).

The next table host computer 10 searches contains the Distributor catalog numbers. Thus, if the data block contains a line representing a requisition for 02 540K, it will be recognized and host computer 10 will proceed to sourcing 306 and pricing 308. If, however, the data block contains a line representing a requisition for 1000 250 (Corning's part number for the beaker), a match will be found in the vendor cross reference file in host database 20 and that item converted to 02 540K for sourcing 306 and pricing 308. When a data block is transmitted in step 312 back to local computer 40 to update the Requisition Item Table, it will contain 02 540K for the relevant line number and that change will be reflected in the Requisition Management data screen 68 displayed at step 294 or the Requisition Maintenance data screen 108 displayed at step 296.

If a requisition contains a line for B2650250, no match will be found in any of the first three tables of host database 20 searched (i.e., the customer-specific, Distributor or vendor tables). The host computer 10 will then search the competitor cross-reference file and identify B2650250 as a competitor's designation for the same PYREX beaker, convert the line to 02 540K and then proceed to sourcing 306 and pricing 308. It is contemplated, but not required, that a warning message be included in the data block transmitted in step 312 for this line to alert the CSR that a conversion from the competitor's catalog number has been made. The CSR will, in any event, review the product description (PYREX Griffin beaker 250 ml) in the Requisition Management data screen 68 displayed at step 294 or the Requisition Maintenance data screen 108 displayed at step 296 to ensure, for example, that the requisition was not a different supplier's B2650250 or 1000 250, representing an entirely different product. In such case, the CSR can revise the requisition to modify or delete the affected line (and send the modified requisition back to the host computer 10 for sourcing) before acceptance.

When the Cross Reference Maintenance data screen 76 is displayed and a data block is sent to host computer 10 containing a vendor number such as 1000 250 or a competitor's number such as B2650250, the host computer 10 will search various files in host database 20 (as during sourcing, described above) and recognize each as a number corresponding to Distributor catalog number 02 540K. The data block returned to the local computer 40 will then contain a set such as:

VN00002047 1000 250 VN00000001 02 540K where the two vendor numbers (VN) represent Corning and the Distributor, respectively, or a set such as:

CP00000013 B2650250 VN00000001 02 540K.

If the local database 50 contains the Customer's equivalent (e.g., BEAKER250 as a stock number), it will add to the Cross-Reference Table lines such as:

| and: | BEAKER250 | VN00002047 | 1000 250 |
|---|---|---|---|
|  | BEAKER250 | CP00000013 | B2650250 | which also contain a description, unit and product type as shown in Table XVII.

If the host computer 10 validates the part number in the received data block as a customer-specific stock number, a Distributor catalog number, a vendor part number or a competitor catalog number found in host database 20, a confirmation data block is sent back to local computer 40 containing information such as the above lines; and local computer 40 then updates the Local Cross Reference Table and the display of Cross Maintenance data screen 76. If a line of the received data block contains a part number not recognized, an error data block with an appropriate error code is transmitted to local computer 40, and the display of the Cross Reference Maintenance data screen 76 is updated accordingly.

If the product type is 04, host computer 10 uses its database of valid vendors and vendor part numbers to validate the data in the received data block. If the vendor number and vendor part number are found in host database 20, a confirmation data block is transmitted. The host computer 10 also reviews, at this time, various cross reference files in host database 20 to determine if the part number identified as an 04 item has become a regular Distributor product. If so, that information is added to the confirmation data block and a warning code (503 meaning PRODUCT TYPE CHANGED FROM (04) TO (03)) is included in the confirmation data block. If validation fails, a data block including an appropriate error code or warning code (see, e.g., code 500 in Table XXIV) is transmitted to local computer 40.

If local computer 40 receives a confirmation, it then creates a new entry in the Local Cross Reference Table in local database 50 with the data the CSR has entered.

The CSR may also edit the information for a particular cross reference number using the F4 (Update) key. Upon hitting the F5 key, the same data block transmission and validation of the updated information by host computer 10 will occur as did in Adding a new cross reference number.

Once a cross-reference number has been added to Local Cross Reference Table, the CSR may enter the Customer's cross-reference number in the STOCK NBR field of Requisition Management data screen 68 to requisition a given item. The entered cross-reference number will then be displayed on Requisition Management data screen 68, Requisition Maintenance data screen 108 and in any other data screen or printout which includes the information in the STOCK NBR field. When data blocks for transmission to host computer 10 are created, however, local computer 40 will access the Local Cross Reference Table (which is maintained in a relational database) to substitute the associated Distributor catalog number (or the vendor catalog number with the associated vendor number) for the Customer cross-reference number.

Thus the CSR may create requisitions using the Customer's own catalog numbers (which will likely be referenced in requisition requests received by the CSR) and the Local Cross Reference Table will translate these numbers into Distributor catalog numbers or catalog numbers of other vendors which are recognized by host computer 10.

Backorder Allocation

When backordered items have been received into stock, the CSR may allocate the received items among outstanding requisitions having a quantity on backorder for the received item or items.

By entering "BOAI" into the RESPONSE field of any data screen, the CSR causes local computer 40 to display the Backorder Inquiry data screen, a sample of which is shown in Table XXII. This data screen uses data in the Requisition Item Table in local database 50 to display the requisition numbers of requisitions having backordered items. This data screen also lists the part number, unit of measure, order quantity, backordered quantity and the available quantity (from the Plant Location Table) for each backordered item. The CSR can allocate received backordered items to a particular requisition by typing and entering an "S" in the SEL (Select) field adjacent the requisition number of the backordered item. This causes local computer 40 to display the Backorder Allocation data screen, a sample of which is set forth in Table XXIII.

The CSR can use the Backorder Allocation data screen to allocate some or all of the received quantity of the backordered item (which will be reflected in the available quantity (AVAIL QTY) field of the relevant line item of the selected requisition.) The CSR enters the amount to be allocated in the allocated quantity (ALLOC QTY) field and hits the F2 (Accept) key. Local computer 40 then checks to see if the allocated quantity exceeds either the available quantity or the ordered quantity for that line item. If this is the case (or if the allocated quantity is less than 1) an appropriate error message is displayed on the Backorder Allocation data screen. If no error message is generated local computer 40 causes printer 43 to generate a picking document as described above unless the CSR has indicated that he does not wish to generate a picking list, which is indicated in the appropriate field of the Plant Location Table. After someone has picked the required items from the JIT facility and the quantities picked have been compared by the CSR to the quantities shown on the picking list, the CSR may again hit the F2 (Accept) key to accept the backorder allocation if the quantities agree. If the quantities do not agree the CSR can go to the Inventory Adjustment data screen and adjust the inventory as described in detail above.

If the product type is 01, after the CSR accepts the backorder allocation local computer 40 builds a data block including the account number, location code, requisition number, the part number, the quantity available, the allocated quantity and the unit of measure and sends this data block to the host computer 10. Host computer 10 then validates the received data, and if valid, updates its database records to reflect the reduction in the quantity on hand of that item at that location. A confirmation is then sent to local computer 40. If validation fails, a data block with an appropriate error code is transmitted to local computer 40. If local computer 40 receives an error code, it displays the appropriate error message on the Backorder Allocation data screen.

If a confirmation is received, local computer 40 then updates the quantity on hand field of the Plant Location Table in local database 50. The status of the line item for the relevant requisition in the Requisition item Table is changed to "F" for Filled if all of the backordered quantity for that line item has been allocated.

If the product type of the line item is 06, after the CSR accepts the backorder allocation, local computer 40 updates the Plant Location Table and Requisition Item Table in local database 50 as discussed above immediately after the CSR hits the F2 (Accept) key. Thus there is no communication with the host computer 10 upon allocation of backordered items of product type 06.

The system of the present invention may also provide for deletion of requisition records from local database 40 when they have been filled. Preferably, deletion will not occur until data from the requisition records is transferred to the Customer's host computer, in whatever form the Customer desires.

The system of the present invention is capable of generating a number of types of flat file data sets or reports to be printed out or to be transmitted to the Customer's host computer. These include: detailed records of purchase orders issued from the Customer to the Distributor; records of purchase orders issued from the Customer to third parties (e.g., for items of product type 05 or for restocking items of product type 06 which are not sourced through the Distributor); usage reports; and performance reports (e.g., showing times to process requisitions into purchase orders or the time from entry of a requisition until a Delivered code was entered to indicate that the requisitioners received the products filling a purchase order.)

Local computer 40 can also direct printer 43 to print a number of documents, including picking lists, packing lists and shipping papers. These documents can, where applicable, be customized to fit the needs of the Customer. Additionally, some of the printed information (e.g., the Requisition Number) may be printed in bar code format to facilitate receiving by the Customer. Thus, using a bar code reader linked to local computer 40, the CSR could automatically access data relating to a particular requisition when items are received by using the bar code scanner to input the Requisition Number from any document (e.g., a packing list) sent with the shipment.

Moreover, persons of ordinary skill in the art will readily understand that slight variations can be made to the embodiment described herein to add functionality. For example, one JIT facility 51 could serve multiple customers, in which case the Customer Account Number can be used to differentiate between the requisitions of the various customers.

Alternatively, one Customer may have multiple stock rooms within a JIT facility 51. Tracking, picking, adjusting and receiving items on local computer 40 will then be performed in a way that enables local database 50 to track the stock in each stockroom, whereas host database 20 may track only the overall stock of the JIT facility 51.

Another alternative would enable the Customer to track demand for items in local database 50. Conventional software may be employed to enable local computer 40 to track orders for all types of products ordered and prepare reports of those orders for the Customer or Distributor.

Requisitions and other data entered by the CSR on local computer 40 may also be entered electronically using an ERI/EDI interface. Thus a requisitioner may electronically transmit requisition data to local computer 40, so that the CSR does not have to enter it manually.

One skilled in the art will appreciate that the present invention can be practiced by other than the described embodiments, which are presented for the purposes of illustration and not of limitation, and the present invention is limited only by the claims which follow.

TABLE 1

* ORDER HEADER INFORMATION *

| | | |
|---|---|---|
| ACCT-NBR: | NAME: | |
| ATTN: | ADDRESS: | |
| CALLER: | : | |
| BILL TO: | HOLD/REL: I | ORDER TYPE: R |
| PRT ACK: N NBR OF COPIES: 0 | RUSH CODE: 9 | FREIGHT OVERRIDE: N |
| REQ NBR: | | ORDER STATUS: |
| RELEASE: | | |

RESPONSE: KEY(S):
PLEASE ENTER A VALID ACCOUNT NUMBER
F1 HELP; F2: ITEM; F3: QUIT; F4: NEW REQ; F5: VAR DATA;
F6: SOURCE; F11: CHG PO; F12: CANCEL

TABLE II

* CUSTOMER VARIABLE HEADER *

FIELD
ID          CUSTOMER ENTERED DATA
DEPT
RESPONSE:       KEY(S):
ALL DATA DISPLAYED
F2: HDR DATA; F3: QUIT; F4: ITM DATA; F7: PAGE BACK;
F8: PAGE FORWARD; F10: DEL LN; F12: CANCEL

TABLE III

* REQUISITION MANAGEMENT *

ACCT NBR: 363690 006 REQ-NBR: PJJ TEST 010

| 0 | LINE | STOCK NBR | QTY | UM | PT | XREF | UNIT PRICE | EXT PRICE | | |
|---|---|---|---|---|---|---|---|---|---|---|
| | 001 | A181 | 1 | EA | 01 | | 16.00 | 16.00 | | |
| | DESC: | ACETONE ACS 1L | | | | QTY AVAIL: 901 | LOC: | WHSE: XYZ | | |
| | 002 | | | | | | | | | |
| | DESC: | | | | | QTY AVAIL: | LOC: | WHSE: | | |
| | 003 | | | | | | | | | |
| | DESC: | | | | | QTY AVAIL: | LOC: | WHSE: | | |
| | 004 | | | | | | | | | |
| | DESC: | | | | | QTY AVAIL: | LOC: | WHSE: | | |
| | 005 | | | | | | | | | |
| | DESC: | | | | | QTY AVAIL: | LOC: | WHSE: | | |

RESPONSE:      KEY(S):
F2: REQ HEADER; F3: QUIT; F4: NEW REQ; F5: VARIABLE PROC; F6: SOURCE;
F7: PAGE BACKWARD; F8: PAGE FORWARD;
F9: NEW ITEMS; F10: NON CATALOG ITEMS; F12: CANCEL REQ

TABLE IV

* REQUISITION MAINTENANCE *

ACCT NBR: 363690 006 REQ-NBR: PJJ TEST 010
ORDER NBR: U30065391 PICKLIST REVIEWED:

| 0 | LINE | STOCK NBR | QTY | UOM | PRD | UNIT PRICE | EXT PRICE | LOC | STATUS |
|---|---|---|---|---|---|---|---|---|---|
| | 001 | A181 | 1 | EA | 01 | 16.00 | 16.00 | XYZ | F |
| | | ACETONE ACS 1L | | | QTY BCKORD: 0 | | QTY REC: 0 | | |

RESPONSE:     KEY(S):
F2: ACCEPT; F3: QUIT; F5: RECV; F7: UP; F8: DOWN; F9: PRT; F10: CONFIRM; F11: CONF BO; F12: CANCEL

TABLE V

* NON-CATALOG INFORMATION *

CUST AC: 363690-006   XYZ, INC.   CALLER PHONE:
REQ NBR: PJJ TEST             LINE NBR: 001
    QTY UN PC VENDOR CAT  UN PRC UN COST EXTD PRC GP
NBR    SIZE
     1 EA                   0.00    0.00
DESCRIPTION: TEST TUB   DIR SHP: N SRV. CHG: 0.00
COMMENT
LINES
VENDOR NBR:         VENDOR NAME:
FROM DATE:          ADDR:
REQ: PJJ75
PROD TYPE:                   PHONE:  -   -   EXT:
05 STOCK NBR: T-110209
RESPONSE:     KEY(S):
F2: ITEM; F3: QUIT; F4: NEW REQ; F6: SOURCE; F7: PAGE BACK;
F8: PAGE FORWARD; F12: CANCEL

TABLE VI

PART MASTER *

ACTION CODE:  PART NBR:   PROD TYPE:   USED IND:
DESCRIPTION:
STD UNIT:              LIST PRICE:
ALT UNIT:              STD COST:

TABLE VI-continued

PART MASTER *

```
                        CURRENT COST:
ABC CLASS:
BUYER:              HAZ MATL:          SAFETY DATA:
COMMODITY:          BOL CODE:
UNIT WT:
CUST OWNED PROD TYPE:    MFG PART NBR:
UNIT OF USE XREF PART NBR:           CONV FACTOR:
STOCK POLICY:       T/O SOURCE WHSE:
LAST MAINT DATE:    CREATION DATE:
RESPONSE:           KEY(S):
PLEASE ENTER ACTION CODE, PART NBR, PROD TYPE
AND PROD USED IND
F3: QUITE; F4: CANCEL; F5: PLANT; F11: CONFIRM UPDATE
```

TABLE VII

* PLANT LOCATION *

```
ACTION CODE MOD PLANT JIT SITE XYZ SOURCE LOCATION
PART NUMBER                  SERIAL/LOT NBR
PRODUCT TYPE
MAX ORDER QTY          0     CREATE DATE
MIN ORDER QTY          0     LAST UPDATE
BACK ORDER QTY         0     LAST RECEIPT
REORDER POINT          0     LAST PHY INV
QTY ON HAND            0     NEXT PHY INV
QTY ON ORDER           0     LAST ADJ
ALLOCATED QTY          0
HOLD CODE         R          STOCK ROOM LOCATION
HOLD CODE AUTHORITY          STOCK ROOM ID
HOLD CODE DATE               VENDOR INFO:
CODE WHSE SECTION 0          NAME
IMPACCT INV LOCATION         MFG #
RESPONSE:         KEY(S):
PART MASTER RECORD NOT FOUND.
PF3: QUIT; PF5: PART; PF6: HST RECV; PF9: CLEAR; PF10:
RESET; PF11: UPDATE; PF12: CANCEL
```

TABLE VIII

* INVENTORY ADJUSTMENT *

```
PART NUMBER  A181       USED        PLANT CODE 01
DESCRIPTION  ACETONE CERTIFIED   UNIT OF MEASURE CS
             ACS 1L
BIN LOCATION                  SERIAL/LOT NBR
ADJUSTMENT QTY                TOTAL BIN QTY   0
   PLUS                       ADJUSTABLE QTY  0
   MINUS                      ALT UOM    PK
                              CONV FACTOR 6
REASON CODE
RESPONSE:         KEY(S):
PF3: QUIT; PF12: CANCEL
PART LOCATION RECORD NOT FOUND.
```

TABLE IX

* TRANSFER ORDER MAINTENANCE *

```
REPL # 930107152426 ORDER NBR STOCK DATE
SOURCE PLANT CODE RECEIVING PLANT CODE XYZ STATUS W TYPE 01
BUYER PJJ75 REQUESTOR PJJ75
SHIP TO
T/O   PART             CONVERT  ORDER  BCKORD  CANCEL
LINE NUMBER   USED UOM FACTOR   QTY    QTY     QTY
RESPONSE:         KEY(S):
F3: QUIT; F5: ACCEPT T/O; F6: CONFIRM; F7: UP; F8: DOWN; F9: NEW T/O;
F10: ADD ITEMS
```

TABLE X

* PLANT LOCATION TABLE *

```
LOCATION ID:
ORDER SEQUENCE:
PICK LIST:
BILL OF LADING:
RESPONSE:      KEY(S):
ENTER A VALID LOC CODE
PF3: QUIT; PF5: ADD; PF6: DEL; PF7: PAGE FORWARD;
PF8: PAGE BACK; PF12: CONFIRM DEL
```

TABLE XI

```
                              MTCH   TYPE    TYPES
DEPT       AN    05     0     N      VD      N
RESPONSE:        KEY(S):
NO MORE DATA TO VIEW.
F1: HELP; F2: DEL; F3: QUIT; F4: ADD; F7: PAGE BACK;
F8: PAGE FORWARD
```

TABLE XII

* CUSTOMER REFERENCE DEFINITIONS *

ORDER HEADER DEFINITIONS

```
1 - PO NUMBER              2 - ACCOUNT NUMBER
3 - FISHER NUMBER          4 - ORDER DATE
5 - ORDER TIME             6 - ORDER TOTAL
7 - BILL TO                8 - ATTN LINE
9 - CALLER                10 - SHP NAME
11 - SHP STR 1            12 - SHP STR 2
13 - SHP CITY             14 - SHP STATE
15 - SHP ZIP
```

ITEM DETAIL DEFINITIONS

```
1 - LINE NUMBER            2 - CATALOG NUMBER
3 - QTY ORDERED            4 - QTY SHIPPED
5 - UNIT SHIPPED           6 - UNIT PRICE
7 - ITEM DESCRIPTION
RESPONSE:      KEY(S):
RECORD NOT FOUND IN THE TABLE.
F1: HELP; F2: DELETE; F3: QUIT
```

TABLE XIII

* CUSTOMER ACCOUNT MAINTENANCE*

```
ACCOUNT NUMBER
WAREHOUSE
NAME
ADDRESS
ADDRESS
CITY
```

TABLE XIII-continued

* CUSTOMER ACCOUNT MAINTENANCE *

STATE
ZIPCODE
STOCKROOM NBR          DOCUMENT ACK
TERMINAL               PACK LIST
PLANT
RESPONSE:    KEY(S):
ENTER IN CUSTOMER ACCOUNT INFORMATION.
F2: DELETE; F3: QUIT; F7: PAGE NUMBER; F8: PAGE BACK;
F9: UPDATE; PF10: REFRESH

TABLE XIV

* RETURN GOODS *

ACCT. NBR: 363690 006 REQ-NBR: PJJ TEST RGA
0  LINE  STOCK NBR  RET QTY UM     PT XREF      UNIT PRICE EXT PRICE
         001
         DESC:                     OLD BIN QTY:     NEW BIN QTY:
         002
         DESC:                     OLD BIN QTY:     NEW BIN QTY:
         003
         DESC:                     OLD BIN QTY:     NEW BIN QTY:
         004
         DESC:                     OLD BIN QTY:     NEW BIN QTY:
         005
         DESC:                     OLD BIN QTY:     NEW BIN QTY:
RESPONSE:    KEY(S):
F2: REQ HEAD; F3: QUIT; F4: NEW REQ; F7: PAGE BACKWARD;
F8: PAGE FORWARD; F9: NEW ITEM; F12: CANCEL REQ

TABLE XV

* DOCUMENT PRINT PROCSS *

| DPT | CUSTOMER PD NUMBER | FSORD NBR | NER | SHIP |
|---|---|---|---|---|
| PJJ 12-2 001 | | | | |
| ATTN: BLD 401 | | U23435355 | | |
| JIM JOHNSON | | | | |
| PJJ 12-8 002 | | | | |
| ATTN: | | | | |
| PJJ 12-08 002 | | U23435357 | | |
| ATTN: | | | | |
| PJJ 12-08 001 | | U23435356 | | |
| ATTN: | | | | |
| PJJ 12-08 003 | | U23435358 | | |
| ATTN: | | | | |
| PJJ 12-08 004 | | U23435359 | | |
| ATTN: | | | | |
| PJJ 12-08 005 | | | | |
| ATTN: | | | | |

RESPONSE:    KEY(S):
MORE ORDERS
PF2: ACK; PF3: QUIT; PF4: BOL; PF5: PICK; PF6: PACK; PF7:
PAGE FORWARD; PF8: PAGE BACKWARD

TABLE XVI

| *** T/O RECEIVALS *** |
|---|

ORDER NBR LINE: RECV: PLANT CODE: STATUS=HDR LINE
PART NBR:     DESC:                              PROD-TYPE:
ISSUE:   PURCH:  ACCEPT INTO RECEIVING?  STCK?
                                       BIN SERIAL/LOT  BIN QTY
ORDER QTY
TOT QTY RECVD
PKG SLIP QTY
QTY RECEIVED
QTY DAMAGED
PKG SLIP NBR
                   TEMPORARY LOCATION    DAMAGE DISP
VENDOR ID          RECEIVAL AUTHORITY    RECV BY
RESPONSE:    KEY(S):
MUST ENTER A VALID T/O ORDER NBR
F3: QUIT; F5: MOD RECEIPT; F10: RECEIVE T/O

TABLE XVII

| *** CROSS REFERENCE NUMBER LIST *** |
|---|

| SEL | CRN | | PT VENDOR NBR | VENDOR | CATALOG NBR | UNIT |
|---|---|---|---|---|---|---|
| | PJJ XREF 001 | | 06 VN00000001 | A181-06 | | EA |
| | | => | TEST TUBE | | <= | CS |
| | PJJ XREF 002 | | 01 VN00000073 | T555 | | |
| | | => | TISSUEPREP 2 4X5LB/CS | | <= | |
| | PJJ XREF 003 | | 01 VN00000073 | T555 | | CS |
| | | => | TISSUEPREP 2 4X5LB/CS | | <= | |
| | T555R | | 01 VN00000073 | T555 | | CS |
| | | => | TISSUEPREP 2 4X5LB/CS | | <= | |
| | | => | | | <= | |
| | | => | | | <= | |

RESPONSE:    KEY(S):
END OF CRN DATA
F3: RETURN; PF5: XREF MAINT; PF7: PAGE BACKWARD; PF8: PAGE FORWARD

TABLE XVIII

| *** CROSS REFERENCE MAINTENANCE *** |
|---|

CROSS REF NUMBER  CATALOG NUMBER  VENDOR NUMBER
PJJ XREF 001      A181-06         VN00000001
DESCRIPTION: TEST TUBE
PROD TYPE: 06 CUSTOM OWNED VEND UM: EA CUST UM: UNIT OF USE: 00000
UNIT PRICE: 0000016.00 COST: 0000000000 PRODUCT CODE:
PHONES: CUST: 000-000-0000 EXT: 0000  /  VEND: 000-000-0000 EXT: 0000
LOCAL BUY IND: DIRECT SHIP IND: PROMISE DATE:   SIZE:
     REQUESTOR:     SERVICE CHARGE: 0000000000
CODE COMMENTS          CODE COMMENTS
RESPONSE:    KEY(S):
F3: RETURN; F4: UPDATE; F5: DELETE; F6: ADD; F7: PREV CRN; F8: NEXT CRN; F9: BLANK SCR

TABLE XIX

| *** TRANSFER ORDER LIST *** |
|---|

| OPIN | REPLENISHMENT NBR | TRANSFER ORD NBR | STATUS | T/O CREATE DATE |
|---|---|---|---|---|
| | 930106140312 | TR0000156 | 0 | 01-06-93 |
| | 921211074641 | TR0000144 | 0 | 12-11-92 |
| | 921211072950 | TR0000143 | 0 | 12-11-92 |
| | 9211211072115 | TR0000142 | 0 | 12-11-92 |
| | 921207161006 | TR0000134 | 0 | 12-07-92 |

OPTIONS:   1 = REPLENISHMENT ORDER DELETION   4 = SINGLE LINE RECEIVAL
           2 = TRANSFER ORDER MAINTENANCE     5 = SINGLE MODIFICATION RECEIPT
           3 = TRANSFER ORDER CLOSE           6 = MULTI-LINE RECEIPT
RESPONSE:    KEY(S):
ALL RETREIVED RECORDS ARE DISPLAYED.
F3: QUIT; F7: PAGE BACKWARD; F8: PAGE FORWARD; F9: SCR 1

TABLE XX

**\*\*\* MODIFY RECEIPT PROCESS \*\*\***

ORD NBR    LINE   RECV       STATUS: HDR   LINE  PLANT CODE
PART NBR           DESCRIPTION
VENDOR NBR
UNIT OF MEASURE
QUANTITY STOCKED         QUANTITY IN RECEIVING
   QUANTITY  BIN LOCATION  SERIAL/LOT NBR  RECEIPT/FUNCTION
                                                            (S = REC TO STOCK)
                                                            (R = STOCK TO REC)
RESPONSE:   KEY(S):
A VALID TRANSFER ORDER ORDER NBR IS NEEDED.
F3: QUIT; F5: MOD RECV QTR; F10: MOD RECEIPT; F12: CANCEL

TABLE XXI

**\*\*\* MULTIPLE LINE STOCK RECEIVAL \*\*\***

ORDER NBR:   SOURCE PLANT:   RECEIVE PLANT:   STATUS:
LINE PART NBR  UPM QTY ORD  TOTA REC  RECEIVE   STATUS    MESSAGE
RESPONSE:   KEY(S):
PLEASE ENTER AN ORDER NUMBER
F3: QUIT; F10: RECEIVE ALL; F11: RECEIVE SELECTED

TALBLE XXII

**\*\*\* BACKORDER INQUIRY \*\*\***

| SEL | REQUISITION NBR | PART NBR | UM | ORDER QTY | BKORD QTY | AVAIL QTY |
|---|---|---|---|---|---|---|
| | PJJ 12-10 002 | A181 | CS | 15 | 15 | 11 |
| | | T555 | CS | 20 | 3 | 47 |
| | PJJ 12-15 002 | A181-06 | EA | 2 | 2 | 2 |

RESPONSE:   KEY(S):
END OF BACKORDER DATA
F3: EXIT; F7: PAGE BACKWARD; F8: PAGE FORWARD

TABLE XXIII

**\*\*\* BACKORDER ALLOCATION \*\*\***

ACCT NBR: 363690 006   REQ NBR: PJJ 12-12 002
PICK LIST REVIEWED:
LINE NBR   PART NBR   UM   ORDER QTY   BKORD QTY   AVAIL QTY   ALLOC QTY
001        A181-06    EA    2              2              2
RESPONSE:   KEY(S):
ALL ITEMS DISPLAYED
F2: ACCEPT; F3: EXIT; F7: PAGE BACKWARD; F8: PAGE FORWARD

TABLE XXIV

ERROR (E) AND WARNING (W) CODES

| MSG CODE | MSG INDICATOR | DISPLAYED MESSAGE |
|---|---|---|
| 012 | E | CUSTOMER BACKORDER NOT ALLOWED |
| 013 | E | ITEM WAS DISCONTINUED |
| 101 | E | FISHER CATALOG NBR NOT FOUND |
| 102 | E | SOURCING ERROR |
| 103 | E | UNIT OF MEASURE ERROR |
| 104 | E | ITEM WAS DISCONTINUED |
| 105 | E | ITEM WAS CANCELED THROUGH SOURCING |
| 106 | E | PRICING FAILURE |
| 107 | E | LOCATION NOT FOUND FOR SOURCING |
| 108 | E | VENDOR NBR NOT FOUND FOR NON-CAT-NBR |
| 109 | E | JIT SITE NOT FOUND ON BLOCATION FILE |
| 110 | E | JIT PART MASTER RECORD NOT FOUND |
| 111 | E | JIT PART LOCATION RECORD NOT FOUND |
| 112 | E | SUB ITEM NOT FOUND - ORDER CREATION |
| 113 | E | BUSINESS VENDOR NOT FOUND - ORDER CREATION |

TABLE XXIV-continued

| MSG CODE | MSG INDICATOR | DISPLAYED MESSAGE |
|---|---|---|
| 114 | E | ITEM CANCELED OR DISCONTINUED - ORDER CREATION |
| 115 | E | PART MASTER NOT FOUND - ORDER CREATION |
| 116 | E | INVENTORY BIN NOT FOUND - ORDER CREATION |
| 117 | E | PRODUCT RECORD NOT FOUND - ORDER CREATION |
| 118 | E | IDMS DEADLOCK OR TIME OUT |
| 119 | E | RIMS INV DOES NOT MATCH HOST INV. |
| 120 | E | ORDER NBR NOT FOUND - ORDER CREATION |
| 121 | E | SALES ORDER NOT FOUND - ORDER CREATION |
| 122 | E | PLANT LOCATION RECORD NOT FOUND - ORDER CREATION |
| 123 | E | BLOCATION RECORD NOT FOUND - ORDER CREATION |
| 124 | E | ASL PLANT LOCATION NOT FOUND - ORDER CREATION |
| 125 | E | ENTERING OVERRIDE LOCATION FOUND - ORDER CREATION |
| 126 | E | CUSTOMER ASSIGNED WHSE NOT FOUND - ORDER CREATION |
| 127 | E | ENTERING LOCATION NOT FOUND - ORDER CREATION |
| 128 | E | CUSTOMER ACCOUNT NOT FOUND - ORDER CREATION |
| 129 | E | SHIP TO RECORD NOT FOUND - ORDER CREATION |
| 130 | E | VALID SALES REP NOT FOUND - ORDER CREATION |
| 131 | E | ITEM IS INACTIVE |
| 132 | E | NEW ITEM CANNOT BE ORDERED YET |
| 133 | E | CUSTOMER ACCOUNT IS INACTIVE |
| 134 | E | CUSTOMER ACCOUNT IS OUT OF BUSINESS |
| 135 | E | CUSTOMER ACCOUNT HAS NOT BEE APPROVED YET |
| 136 | E | CUSTOMER ACCOUNT HAS BEEN ASSIGNED TO AN INVALID WHSE |
| 137 | E | INVALID STATE ENTERED FOR ZIP CODE |
| 138 | E | FURNITURE ITEMS CAN NOT BE ORDERED THROUGH RIMS |
| 139 | E | DEA ITEMS CAN NOT BE ORDERED THROUGH RIMS |
| 140 | E | EMD ITEMS CAN NOT BE ORDERED THROUGH RIMS |
| 141 | E | INVALID STATE ENTERED FOR ZIP CODE |
| 246 | E | UNIT OF MEASURE CHANGED (PRICING FILES NOT IN SYNC) |
| 250 | E | PRICE OR EXTENDED PRICE > 99,999.99 |
| 500 | W | NON-CAT-NBR NOT FOUND ON PRODUCT DATABASE |
| 501 | W | UNIT OF MEASURE DEFAULT TO STANDARD |
| 502 | W | JIT BACKORDER WILL OCCUR |
| 503 | W | PRODUCT TYPE CHANGED FROM (04) TO (03) |
| 624 | E | NO EACH PRICE |
| TRANSFER ORDER ERROR (E) AND WARNING (W) CODES ||||
| T20 | W | EARLY SHIPMENT |
| T21 | W | LATE SHIPMENT |
| T60 | E | BO NO INCREASE |
| T61 | E | QTY > RECEIVED |
| T62 | E | QTY > ISSUED |
| T63 | E | QTY > SHIPPED |
| T64 | E | QTY > IN-TRANSIT QTY |
| T69 | E | QTY REC INVALID |
| T70 | E | SOURCE/PLANT NF |
| T71 | E | REC/PART/PLT NF |
| T73 | W | PART HOLDSOURCE |
| T74 | W | PART HOLD REC |
| T75 | E | PHAMTOMPART SRC |
| T76 | E | PHAMTOMPART REC |
| T79 | E | BIN LOC INVALID |
| T80 | E | ORD MASTER ITEM NF |
| T81 | E | SPECIAL INVALID |
| T82 | E | PART MASTER NF |
| T83 | W | PART ON HOLD |
| T84 | E | INVALID MPS |
| T85 | E | PHANTOM PART |
| T86 | E | ITEM NOT IN TRANSIT |
| T87 | W | STATUS INVALID/REC |
| T88 | E | REGULATED PART |
| T89 | E | PRODUCT REC NF |
| T90 | W | BACKORDER PARTS |
| T91 | W | PARTIAL REJECT |
| T92 | W | REJECTED ALL |
| T99 | E | IDMS DATABASE ERROR |

We claim:
1. A Just-In-Time requisition and inventory management system comprising:

a local computer maintaining a local database including a local inventory record indicating quantities of items on hand at a local warehouse;

a host computer maintaining a host database, said host database including a host inventory record that includes multiple inventory portions, wherein:

one inventory portion of said host inventory record indicates quantities of items on hand at a central location; and another inventory portion of said host inventory record indicates quantities of items on hand at said local warehouse;

means for bi-directionally communicating between said local computer and said host computer to permit the bi-directional exchange of data between said host database and said local database;

means for sourcing requested quantities of items at desired times, including:

means, provided at said local computer, for generating a requisition order for a requisitioned item;

means for searching said local database for a local inventory record corresponding to said requisitioned item to determine if a requested quantity of said requisitioned item is available at said local warehouse;

means for performing the following steps (A), (B) and (C) from said local computer if said requested quantity of said requisitioned item is available at said local warehouse:

(A) sourcing said requisitioned item from said local warehouse;

(B) updating said local inventory record to indicate the sourcing of said requisitioned item from said local warehouse; and (C) using said bi-directional communication means to similarly update that portion of said host inventory record, present at said host computer, that indicates quantities of items on hand at said local warehouse;

said searching means further comprising means for searching said host database for a host inventory record corresponding to said requisitioned item if said requested quantity of said requisitioned item is not available at said local warehouse;

means for performing the following steps (D), (E), and (F) from said host computer if said requested quantity of said requisitioned item is not available at said local warehouse but is available at said central location:

(D) using said bi-directional communicating means to transmit data from said host computer to said local computer indicating that said requested quantity of said requisitioned item is available at said central location;

(E) directing the transfer of said requested quantity of said requisitioned item from said central location to said local warehouse; and (F) updating said host database to indicate the transfer of said requested quantity of said requisitioned item from said central location to said local warehouse by subtracting said requested quantity of said requisitioned items from that portion of said host inventory record, present at said host computer, that indicates quantities of items on hand at said central location; and (G) using said bi-directional communication means to update said local database, from said host computer, by adding said requested quantity of said requisitioned items to said local inventory record.

2. The Just-In-Time requisition and inventory management system according to claim 1, wherein some of the items located at said local warehouse are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said system further comprises:

means for automatically generating a purchase order to replenish the inventory of said item in said local warehouse if said ownership field indicates that said item is owned by said customer and if the quantity on hand minus the requested quantity of said item is less than the reorder point for said item; and means for automatically generating a transfer order to replenish the inventory of said item in said local warehouse if said ownership field indicates that said item is owned by said distributor and if the quantity on hand minus the requested quantity of said item is less than the reorder point for said item.

3. The requisition and inventory management system of claim 1 wherein the data for said requisition order is electronically entered into said local computer.

4. The Just-In-Time requisition and inventory management system of claim 1 wherein some of the items located at said local warehouse are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said system further comprises:

means for automatically generating a purchase order to replenish the inventory of said item in said local warehouse if said ownership field indicates that said item is owned by said customer and if the quantity on hand minus the requested quantity of said item is less than the reorder point for said item.

5. The requisition and inventory management system of claim 4 wherein said local warehouse includes a plurality of stock rooms.

6. The requisition and inventory management system of claim 4 wherein said local warehouse includes inventory for at least a first customer and a second customer.

7. The requisition and inventory management system of claim 1 wherein said local warehouse includes a plurality of stock rooms.

8. The requisition and inventory management system of claim 1 wherein said local warehouse includes inventory for at least a first customer and a second customer.

9. The Just-In-Time requisition and inventory management system of claim 1 wherein some of the items located at said local warehouse are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said system further comprises:

means for automatically generating a transfer order to replenish the inventory of said item in said local warehouse if said ownership field indicates that said item is owned by said distributor and if the quantity on hand minus the requested quantity of said item is less than the reorder point for said item.

10. The requisition and inventory management system of claim 9 wherein said local warehouse includes a plurality of stock rooms.

11. The requisition and inventory management system of claim 9 wherein said local warehouse includes inventory for at least a first customer and a second customer.

12. The requisition and inventory management system of claim 1 further comprising means at said local computer for obtaining from said host computer and displaying an indication of the quantity on hand at said central location of said requisitioned item.

13. The requisition and inventory management system of claim 1 further comprising means at said local computer for obtaining and displaying information updating the status of an outstanding requisition order.

14. The requisition and inventory management system of claim 1 further comprising means at said local computer for automatically creating proposed replenishment orders to replenish inventory in said local warehouse.

15. The requisition and inventory management system of claim 14 wherein said proposed replenishment orders may selectively be converted to purchase orders.

16. A method of managing a Just-In-Time inventory, said method comprising the steps of:

maintaining a local database with a local computer, the local database including a local inventory record indicating quantities of items on hand at a local warehouse;

maintaining a host database with a host computer, the host database including a host inventory record that includes multiple inventory portions, wherein:

one inventory portion of said host inventory record indicates quantities of items on hand at a central location; and another inventory portion of said host inventory record indicates quantities of items on hand at said local warehouse;

providing means for bi-directionally communicating between said local computer and said host computer, to permit the bi-directional exchange of data between said host database and said local database;

sourcing requested quantities of items at desired times, by way of at least the following steps:

generating a requisition order for a requisitioned item;

searching said local database for a local inventory record corresponding to said requisitioned item to determine if a requested quantity of said requisitioned item is available at said local warehouse;

performing the following steps (A), (B) and (C) from said local computer if said requested quantity of said requisitioned item is available at said local warehouse:

(A) sourcing said requisitioned item from said local warehouse;

(B) updating said local inventory record to indicate the sourcing of said requisitioned item from said local warehouse; and (C) using said bi-directional communication means to similarly update portion of said host inventory record, present at said host computer, that indicates quantities of items on hand at said local warehouse;

searching said host database for a host inventory record corresponding to said requisitioned item if said requested quantity of said requisitioned item is not available at said local warehouse;

performing the following steps (D), (E) and (F) from said host computer if said requested quantity of said requisitioned item is not available at said local warehouse but is available at said central location:

(D) using said bi-directional communicating means to transmit data from said host computer to said local computer indicating that said requested quantity of said requisitioned item is available at said central location;

(E) directing the transfer of said requested quantity of said requisitioned item from said central location to said local warehouse;

(F) updating said host database to indicate the transfer of said requested quantity of said requisitioned items from said central location to said local warehouse by subtracting said requested quantity of said requisitioned items from that portion of said host inventory record, present at said host computer, that indicates quantities of items on hand at said central location.

17. The method of managing an inventory of claim 16 further comprising the steps of obtaining from said host computer and displaying at said local computer an indication of the quantity on hand at said central location of said requisitioned item.

18. The method of managing an inventory of claim 16 further comprising the steps of obtaining and displaying at said local computer information updating the status of an outstanding requisition order.

19. The method of managing the Just-In-Time inventory of claim 16 wherein some of the items located at said local warehouse are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said method further comprises:

automatically generating a purchase order to replenish the inventory of said item in said local warehouse if said ownership field indicates that said item is owned by said customer and if the quantity on hand minus the requested quantity of said item is less than the reorder point for said item.

20. The method of managing a just in time inventory of claim 19 wherein said local warehouse includes a plurality of stock rooms.

21. The method of managing a just in time inventory of claim 19 wherein said local warehouse includes inventory for at least a first customer and a second customer.

22. The method of managing an inventory of claim 16 further comprising the step of automatically creating proposed orders to replenish inventory in said local warehouse.

23. The method of managing an inventory of claim 22 wherein said proposed orders may selectively be converted to purchase orders.

24. The method according to claim 16, wherein some of the items located at said local warehouse are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said method further comprises the steps of:

automatically generating a purchase order to replenish the inventory of said item in said local warehouse if said ownership field indicates that said item is owned by said customer and if the quantity on hand minus the requested quantity of said item is less than the reorder point for said item; and automatically generating a transfer order to replenish the inventory of said item in said local warehouse if said ownership field indicates that said item is owned by said distributor and if the quantity on hand minus the requested quantity of said item is less than the reorder point for said item.

25. The method of managing the Just-In-Time inventory of claim 16 wherein some of the items located at said local warehouse are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said method further comprises:

automatically generating a transfer order to replenish the inventory of said item in said local warehouse if said ownership field indicates that said item is owned by said distributor and if the quantity on hand minus the requested quantity of said item is less than the reorder point for said item.

26. The method of managing the Just-In-Time inventory of claim 25 wherein said local warehouse includes a plurality of stock rooms.

27. The method of managing the Just-In-Time inventory of claim 25 wherein said local warehouse includes inventory for at least a first customer and a second customer.

28. The method of managing an inventory of claim 16 wherein the data for said requisition order is electronically entered into said local computer.

29. The method of managing an inventory of claim 16 wherein said local warehouse includes a plurality of stock rooms.

30. The method of managing an inventory of claim 16 wherein said local warehouse includes inventory for at least a first customer and a second customer.

31. A Just-In-Time requisition and inventory management system comprising:

a plurality of local computers maintaining respective local databases including a local inventory records indicating quantities of items on hand at respective local warehouses;

a host computer maintaining a host database, said host database including a host inventory record that includes multiple inventory portions, wherein:
  one inventory portion of said host inventory record indicates quantities of items on hand at a central location; and
  other inventory portions of said host inventory record respectively indicate quantities of items on hand at said local warehouses;
means for bi-directionally communicating between said host computer and said local computers to permit the bi-directional exchange of data between said host database and said local databases;
means, provided at each of said local computers, for sourcing requested quantities of items at desired times, including:
  means for generating a requisition order for a requisitioned item;
  means for searching the local database corresponding to said local computer for a local inventory record corresponding to said requisitioned item to determine if a requested quantity of said requisitioned item is available at the corresponding local warehouse;
  means for performing the following steps (A), (B) and (C) if said requested quantity of said requisitioned item is available at said corresponding local warehouse:
    (A) sourcing said requisitioned item from said corresponding local warehouse;
    (B) updating the corresponding local inventory record to indicate the sourcing of said requisitioned item from said local warehouse; and
    (C) using said bi-directional communication means to similarly update that portion of said host inventory record, present at said host computer, that indicates quantities of items on hand at said corresponding local warehouse;
  said searching means further comprising means for searching said host database for a host inventory record corresponding to said requisitioned item if said requested quantity of said requisitioned item is not available at said corresponding local warehouse;
  means for performing the following steps (D), (E) and (F) from said host computer if said requested quantity of said requisitioned item is not available at said corresponding local warehouse but is available at said central location:
    (D) using said bi-directional communicating means to transmit data from said host computer to said local computer indicating that said requested quantity of said requisitioned item is available at said central location;
    (E) directing the transfer of said requested quantity of said requisitioned item from said central location to said corresponding local warehouse; and
    (F) updating said host database to indicate the transfer of said requested quantity of said requisitioned item from said central location to said local warehouse by subtracting said requested quantity of said requisitioned items from that portion of said host inventory record, present at said host computer, that indicates quantities of items on hand at said central location.

32. The Just-In-Time requisition and inventory management system according to claim 31, wherein some of the items located at at least one said local warehouses are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said system further comprises:
  means for automatically generating a purchase order to replenish the inventory of said item in said at least one local warehouse if said ownership field indicates that said item is owned by said customer and if the quantity on hand minus the requested quantity of said item is less than the reorder point for said item; and
  means for automatically generating a transfer order to replenish the inventory of said item in said at least one local warehouse if said ownership field indicates that said item is owned by said distributor and if the quantity on hand minus the requested quantity of said item is less than the reorder point for said item.

33. The Just-In-Time requisition and inventory management system according to claim 31, wherein some of the items located at least one of said local warehouses are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said system further comprises:
  means for automatically generating a purchase order to replenish the inventory of said item in said at least one local warehouse if said ownership field indicates that said item is owned by said customer and if the quantity on hand minus the requested quantity of said item is less than the reorder point for said item.

34. The Just-In-Time requisition and inventory management system according to claim 31, wherein some of the items located at at least one of said local warehouses are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said system further comprises:
  means for automatically generating a transfer order to replenish the inventory of said item in said at least one local warehouse if said ownership field indicates that said item is owned by said distributor and if the quantity on hand minus the requested quantity of said item is less than the reorder point for said item.

35. A method of managing a Just-In-Time inventory, said method comprising the steps of:
  maintaining a plurality of local databases with a plurality of respective local computers, the local databases each including local inventory records indicating quantities of items on hand at respective local warehouses;
  maintaining a host database with a host computer, the host database including a host inventory record that includes multiple inventory portions, wherein:
    one inventory portion of said host inventory record indicates quantities of items on hand at a central location; and
    other inventory portions of said host inventory record respectively indicate quantities of items on hand at said local warehouses;

providing means for bi-directionally communicating between said local computers, to permit the bi-directional exchange of data between said host database and said local databases;

at any one of said local computers, selectively sourcing requested quantities of items at desired times by way of at least the following steps:

generating a requisition order for a requisitioned item;

searching the local database corresponding to said local computer for a local inventory record corresponding to said requisitioned item to determine if a requested quantity of said requisitioned item is available at the corresponding local warehouse;

performing the following steps (A), (B) and (C) if said requested quantity of said requisitioned item is available at said corresponding local warehouse:

(A) sourcing said requisitioned item from said corresponding local warehouse;

(B) updating the corresponding local inventory record to indicate the sourcing of said requisitioned item from said corresponding local warehouse; and (C) using said bi-directional communication means to similarly update that portion of said host inventory record, present at said host computer, that indicates quantities of items on hand at said corresponding local warehouse;

searching said host database for a host inventory record corresponding to said requisitioned item if said requested quantity of said requisitioned item is not available at said corresponding local warehouse;

performing the following steps (D), (E) and (F) and from said host computer if said requested quantity of said requisitioned item is not available at said corresponding local warehouse but is available at said central location:

(D) using said bi-directional communicating means to transmit data from said host computer to said local computer indicating that said requested quantity of said requisitioned item is available at said central location;

(E) directing the transfer of said requested quantity of said requisitioned item from said central location to said corresponding local warehouse; and (F) updating said host database to indicate the transfer of said requested quantity of said requisitioned item from said central location to said local warehouse by subtracting said requested quantity of said requisitioned items from that portion of said host inventory record, present at said host computer, that indicates quantities of items on hand at said central location.

36. The method according to claim 35, wherein some of the items located at at least one of said local warehouses are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said method further comprises the steps of:

automatically generating a purchase order to replenish the inventory of said item in said at least one local warehouse if said ownership field indicates that said item is owned by said customer and if the quantity on hand minus the requested quantity of said item is less than the reorder point for said item; and automatically generating a transfer order to replenish the inventory of said item in said at least one local warehouse if said ownership field indicates that said item is owned by said distributor and if the quantity on hand minus the requested quantity of said item is less than the reorder point for said item.

37. The method according to claim 35, wherein some of the items located at at least one of said local warehouses are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said method further comprises the step of:

automatically generating a purchase order to replenish the inventory of said item in said at least one local warehouse if said ownership field indicates that said item is owned by said customer and if the quantity on hand minus the requested quantity of said item is less than the reorder point for said item.

38. The method according to claim 35, wherein some of the items located at at least one of said local warehouses are owned by a customer and some of said items are owned by a distributor, wherein said local inventory record further includes at least one ownership field indicating the items owned by the customer and the items owned by said distributor, a field indicating the requested quantity of said item, and a field indicating a reorder point for said item, wherein said method further comprises the step of:

automatically generating a transfer order to replenish the inventory of said item in said at least one of local warehouses if said ownership field indicates that said item is owned by said distributor and if the quantity on hand minus the requested quantity of said item is less than the reorder point for said item.

* * * * *